United States Patent
Talbert et al.

(10) Patent No.: US 10,645,754 B2
(45) Date of Patent: May 5, 2020

(54) SYSTEMS AND METHODS FOR WIRELESS BACKHAUL IN A LOCAL NETWORK

(71) Applicant: Verizon Patent and Licensing Inc., Arlington, VA (US)

(72) Inventors: Michael Talbert, Nazareth, PA (US); Christina L. Fyock, Sudbury, MA (US); Meaghan Leong, Cohasset, MA (US); Tim Bennington-Davis, Tualatin, OR (US); Christopher M. Schmidt, Branchburg, NJ (US)

(73) Assignee: Verizon Patent and Licensing I nc., Basking Ridge, NJ (US)

( * ) Notice: Subject to any disclaimer, the term of this patent is extended or adjusted under 35 U.S.C. 154(b) by 43 days.

(21) Appl. No.: 16/040,206

(22) Filed: Jul. 19, 2018

(65) Prior Publication Data
US 2020/0029393 A1    Jan. 23, 2020

(51) Int. Cl.
*H04W 88/16* (2009.01)
*H04W 76/15* (2018.01)
*H04W 92/02* (2009.01)

(52) U.S. Cl.
CPC ........... *H04W 88/16* (2013.01); *H04W 76/15* (2018.02); *H04W 92/02* (2013.01)

(58) Field of Classification Search
CPC .................................................... H04W 88/16
See application file for complete search history.

(56) References Cited

U.S. PATENT DOCUMENTS

2004/0196798 A1 * 10/2004 Abousleman .......... H04B 7/185
                                                                 370/316

OTHER PUBLICATIONS

U.S. Department of Commerce, ntia.doc.gov, "Evaluation of the 5350-5470 MHZ and 5850-5925 MHZ Bands Pursuant to Section 6406(b) of the Middle Class Tax Relief and Job Creation Act of 2012", https://www.ntia.doc.gov/files/ntia/publications/ntia_5_ghz_report_01-25-2013.pdf, Jan. 2013, 94 pages.
Ubiquiti Networks, Inc., "Up to 20 Gbps Aggregate Performance* and Sub-Millisecond Latency with World's Best Unlicensed-Band 15.9 bps/Hz Spectral Efficiency.", https://www.ubnt.com/airfiber/airfiber/, Dec. 18, 2014, 10 pages.

* cited by examiner

*Primary Examiner* — Sulaiman Nooristany

(57) ABSTRACT

A network device receives, from a user device, a data packet on a first wireless channel between the user device and the network device. The network device processes the data packet based on receiving the data packet, and transmits the processed data packet to a second network device on a second wireless channel between the network device and the second network device. The network device, the second network device, and the user device are included in a local network. The first network device and the second network device are communicatively connected via a wireless full-duplex link that includes the second wireless channel and a third wireless channel. The first wireless channel, the second wireless channel, and the third wireless channel are different wireless channels.

20 Claims, 20 Drawing Sheets

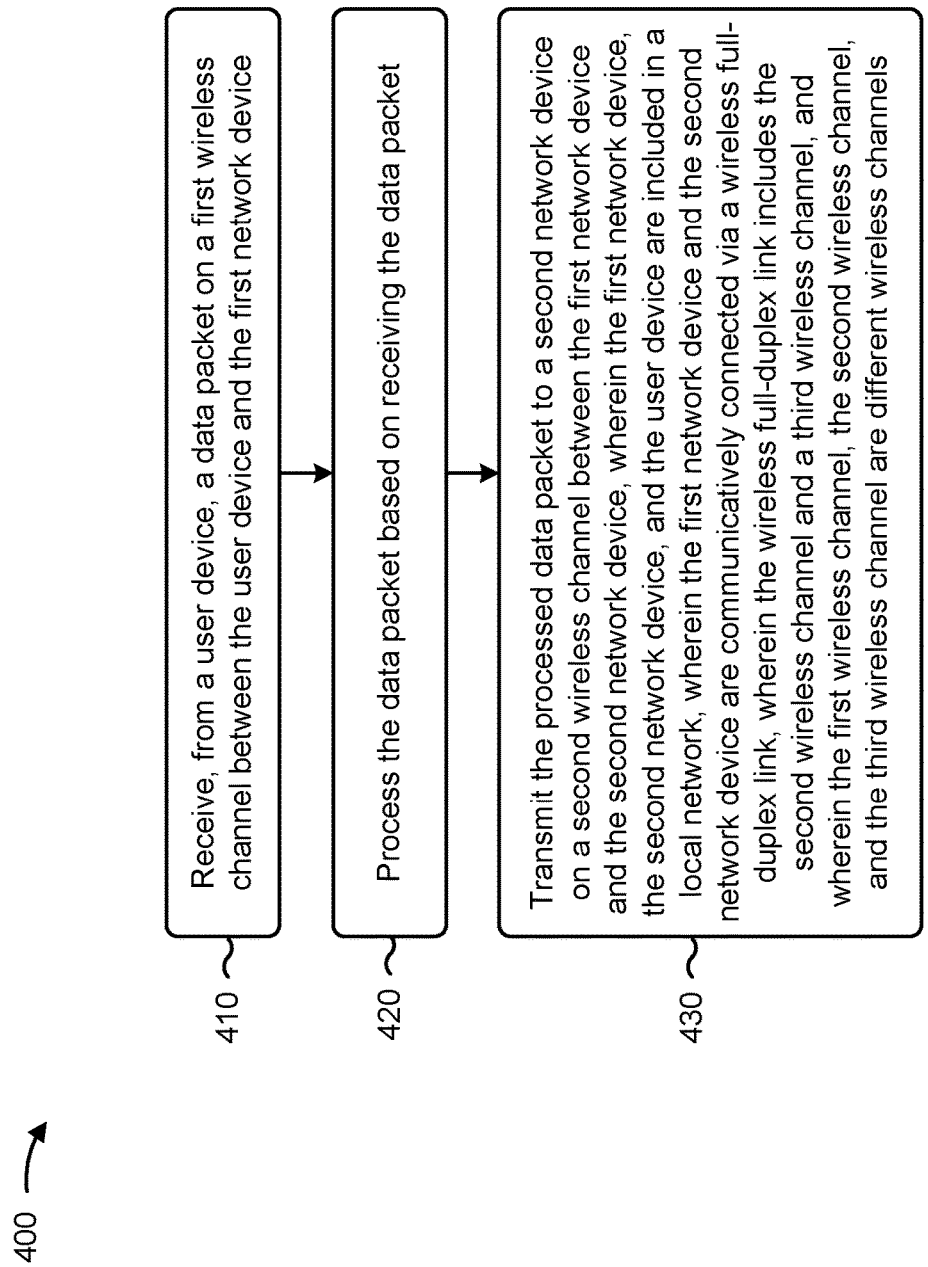

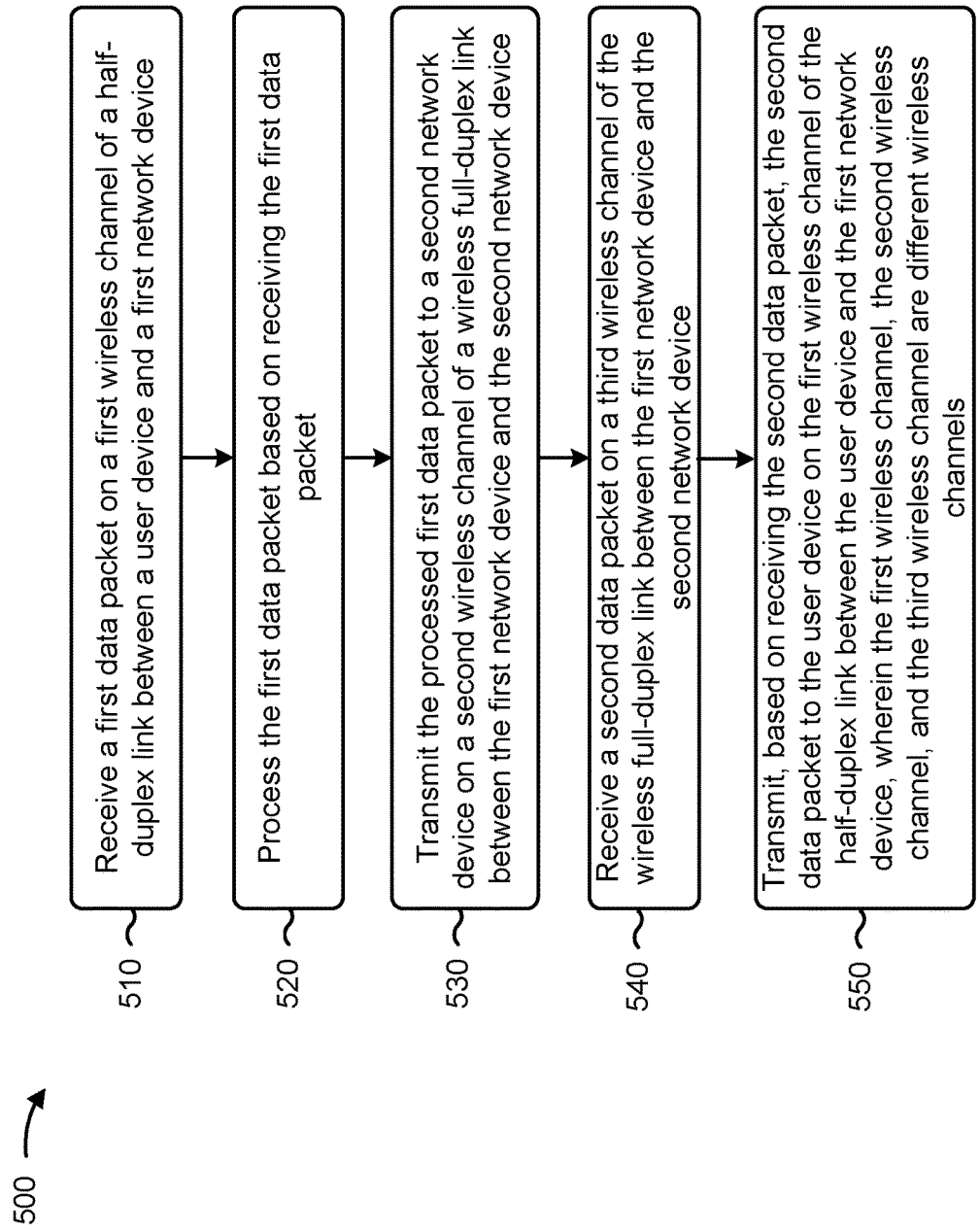

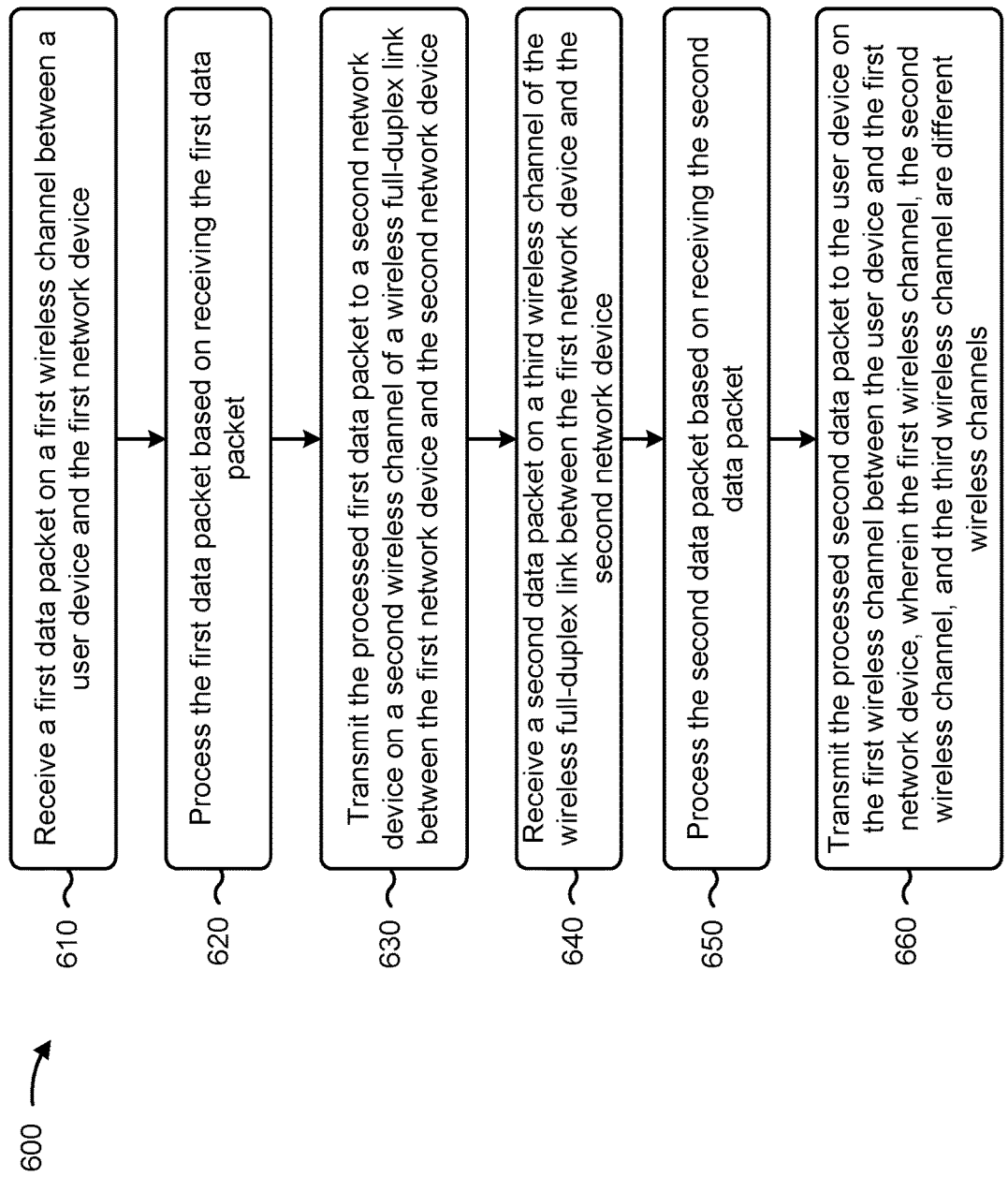

SYSTEMS AND METHODS FOR WIRELESS BACKHAUL IN A LOCAL NETWORK

BACKGROUND

A local network may include a network device, such as a gateway, router, access point, and/or the like that provides one or more user devices included in the local network with access to one or more networks external to the local network. The network device may, in some cases, provide a wireless coverage area, which may allow the one or more user devices included in the local network to wirelessly connect to the network device.

BRIEF DESCRIPTION OF THE DRAWINGS

FIG. 4 is a flow chart of an example process for wireless backhaul in a local network.

FIG. 5 is a flow chart of an example process for wireless backhaul in a local network.

FIG. 6 is a flow chart of an example process for wireless backhaul in a local network.

DETAILED DESCRIPTION OF PREFERRED EMBODIMENTS

Figure 1A:
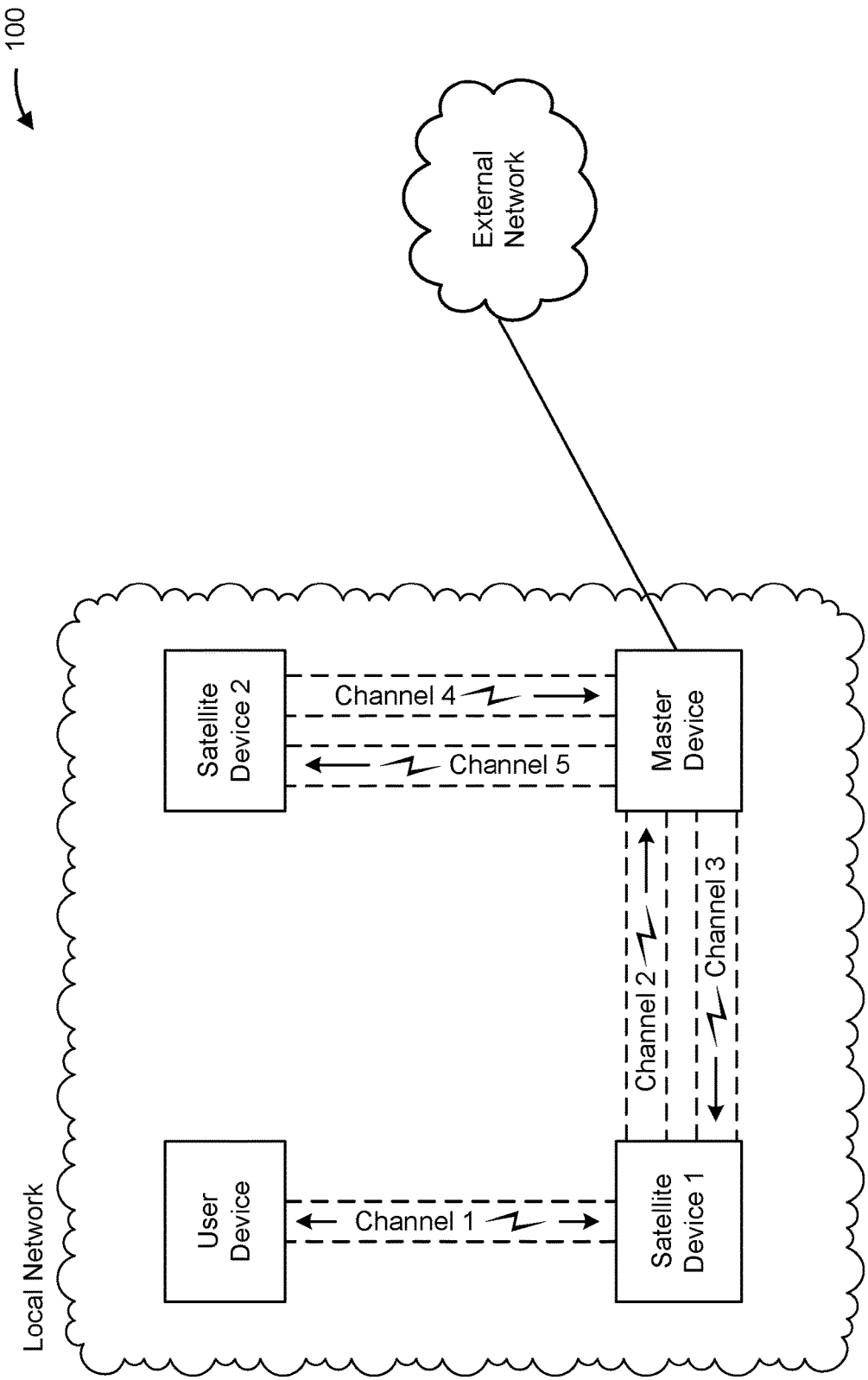
FIGS. 1A-1O is a diagram of an example implementation described herein.

The following detailed description of example implementations refers to the accompanying drawings. The same reference numbers in different drawings may identify the same or similar elements.

A local network may include a plurality of network devices to increase the range of a wireless coverage area in the local network. For example, a local network may include a master device (e.g., wireless gateway, wireless router, wireless access point, and/or the like), that broadcasts a wireless signal and one or more repeater (or extender) devices that receive the wireless signal and rebroadcast the wireless signal, thereby increasing the wireless coverage area in the local network. As another example, a local network may include a master device and a plurality of satellite devices interconnected in a wireless mesh. The master device and each satellite device, of the plurality of satellite devices, may generate a first wireless signal for providing a wireless coverage area in the local network and a second wireless signal for communication between the master device and the plurality of satellite devices in the wireless mesh. A satellite device, of the plurality of satellite devices, in the wireless mesh may receive a data packet from a user device in the wireless coverage area, and may transmit the data packet to the master device either directly or via another satellite device in the wireless mesh.

While the techniques described above may increase wireless coverage area in a local network, the increase in the wireless coverage area comes at a cost of throughput and latency in the local network. For example, some repeater devices rebroadcast a wireless signal from a master device on the same wireless channel as the wireless signal, and only a portion of the available bandwidth of the wireless channel may be used to provide a wireless coverage area because another portion of the available bandwidth of the wireless channel is used to communicate with the master device. Similarly, some satellite devices in a wireless mesh may communicate with a master device in the wireless mesh using the same wireless channel that is used to provide a wireless coverage area, and as a result the satellite devices, the master device, and any user devices within the wireless coverage area compete for airtime resources on the wireless channel. Moreover, some satellite devices in a wireless mesh may communicate with a master device in the wireless mesh using a half-duplex link, which incurs additional processing, network, and memory resources to schedule transmissions on the half-duplex link.

Some implementations described herein provide a network device capable of receiving, from a user device, a data packet on a first wireless channel between the user device and the network device, processing the data packet, and transmitting the data packet to another network device on a second wireless channel between the network device and the other network device. The network device and the second network device may be communicatively connected via a wireless full-duplex link that includes the second wireless channel and a third wireless channel. In some implementations, the first wireless channel, the second wireless channel, and the third wireless channel are each be different wireless channels. In some implementations, the first wireless channel, the second wireless channel, and the third wireless channel may each be different non-overlapping wireless channels. In this way, communications between the user device and the network device, and communications between the network device and the other network device, do not compete for airtime on the same wireless channel, which increases throughput in the local network, decreases latency in the local network, and increases scalability of the local network as more devices are added to the local network. Moreover, since the link between the network device and the other network device is a wireless full-duplex link, processing and memory resources on the network device and the other network devices that would otherwise be used to perform half-duplex scheduling are conserved.

FIGS. 1A-1O are diagrams of an example implementation 100 described herein. As shown in FIG. 1A, example implementation 100 may include a user device, a plurality of network devices, such as one or more satellite devices (e.g., satellite device 1, satellite device 2, etc.) (collectively referred to herein as "satellite devices" and individually referred to as "satellite device") and a master device, a local network, an external network, and/or the like.

The external network may include various types of networks, such as a data network, a wide area network (WAN) such as the Internet, an Internet service provider (ISP) network, an access network, a mobile network, and/or the like. In some implementations, the external network may transmit data packets to, and/or receive data packets from, the local network.

The local network may include various types of wired and/or wireless local area networks (LANs), such as a wired LAN, a wireless LAN (WLAN), a home network, an office network, a campus network, and/or the like. The local network may include various devices, such as the user device, the satellite devices, the master device, and/or the like. In some implementations, the local network may enable devices in the local network to communicate using various wired and/or wireless communications protocols, such as Ethernet, Wi-Fi, Bluetooth, near-field communications (NFC), Zigbee, Z-wave, and/or the like.

The user device may include various types of user devices, such as a mobile device (e.g., a smart phone, a tablet computer, a laptop computer, a handheld computer, and/or the like), a wearable communications device (e.g., a smart wristwatch, a pair of smart eyeglasses, and/or the like), a desktop computer, and Internet of Things (IoT) device (e.g., a smart refrigerator, a smart thermostat, a home management device, a security system, a smart washer or dryer, a garage door opener, and/or the like), a smart entertainment device (e.g., a gaming system, a smart television, a sound bar, a media player, a home audio/video receiver, a smart speaker, and/or the like), and/or the like.

In some implementations, the user device may communicate with a satellite device (e.g., satellite device 1) and/or the master device in the local network. In some implementations, the user device may communicate with the satellite device and/or the master device using a half-duplex link (e.g., an IEEE 802.11 protocol link, a Bluetooth link, etc.). A half-duplex link may be a two-way communication link that uses a single wireless channel (e.g., channel 1). The user device the satellite device, and/or master device may share airtime on the wireless channel to transmit data packets such that the user device the satellite device, and/or the master device transmit at different times on the same wireless channel. In some implementations, the user device may communicate with the satellite device and/or the master device using a full-duplex link.

A wireless channel (e.g., channel 1, channel 2, etc.) may include a particular channel frequency and an upper frequency bound and a lower frequency bound determined based on a channel width (e.g., 20 MHz, 40 MHz, etc.). For example, channel 1 may have a channel frequency of 2.412 GHz and a channel width of 20 MHz, and therefore may have an upper frequency bound of 2.422 GHz and a lower frequency bound of 2.402 GHz. In some implementations, a channel frequency may be associated with various licensed and/or unlicensed RF ranges, such as the 2.4 GHz RF range (e.g., between 2.4 GHz and 2.5 GHz), the 5 GHz RF range (e.g., between 4.9 GHz and 6 GHz), the 60 GHz RF range (e.g., between 57 GHz and 64 GHz), and/or the like. In some implementations, a channel frequency may be unassociated with a RF range and/or with any defined communication protocol channels. While FIGS. 1A-1L illustrate channels 1 through 5, the quantity of channels is an example, and a greater or fewer quantity of channels may be included.

The satellite devices and the master device may include various types of network devices, such as a wireless router, a wireless gateway, a wireless network bridge, a wireless hub, a wireless access point, and/or the like. In some implementations, the master device may be communicatively connected with the external network. The satellite devices and/or the master device may provide the user device with a wireless coverage area in the local network such that the user device may communicate with the external network (and devices included therein) via the master device. For example, a user device may transmit a data packet to a device included in the external network by transmitting the data packet to a satellite device (e.g., satellite device 1), the satellite device may transmit the data packet to the master device, and the master device may transmit the data packet to the device in the external network. Similarly, the user device may receive a data packet from the device included in the external network by the device included in the external network transmitting the data packet to the master device, the master device transmitting the data packet to the satellite device, and the satellite device transmitting the data packet to the user device.

In some implementations, a satellite device in the local network (e.g., satellite device 1) may be communicatively connected with the master device via a wireless backhaul. The wireless backhaul may be a wireless full-duplex link, which may allow the satellite device to simultaneously transmit data packets to, and receive data packets from, the master device, and vice-versa. For example, the satellite device may transmit one or more first data packets to the master device on a first channel, of the wireless full-duplex link, at a time that overlaps with the satellite device receiving one or more second data packets from the master device on a second channel, of the wireless full-duplex link, while the satellite device is receiving the one or more second data packets from the master device on the second channel, and/or the like. In some implementations, the satellite device may be communicatively connected with another satellite device in the local network (e.g., satellite device 2) via a wireless sidehaul. The wireless sidehaul may be implemented in a manner similar to the wireless backhaul between the satellite device and the master device.

In some implementations, to achieve a wireless full-duplex link, the wireless backhaul between the satellite device and the master device may be implemented using a plurality of different wireless channels. For example, the wireless backhaul between the satellite device and the master device may include a first wireless channel (e.g., channel 2) and a second wireless channel (e.g., channel 3). The first wireless channel may be used to transmit data packets from the satellite device to the master device, and the second wireless channel may be used to transmit data packets from the master device to satellite device 1, or vice-versa.

In some implementations, the first wireless channel and the second wireless channel may be different wireless channels. For example, the first wireless channel may be associated with a center frequency of 2.437 GHz, and the second wireless channel may be associated with a center frequency of 2.462 GHz. In some implementations, the first wireless channel, the second wireless channel, a third wireless channel between the satellite device and the user device (e.g., channel 1), and a fourth wireless channel (e.g., channel 4) and fifth wireless channel (e.g., channel 5) between another satellite device (e.g., satellite device 2) and the master device, may each be associated with a wireless channel. In this way, the satellite device and the master device do not share airtime for transmitting data packets on the same wireless channel, which improves throughput on the wireless backhaul between the satellite device and the master device and reduces the amount of processing and memory resources used for scheduling transmissions over the wireless backhaul. Moreover, in this way, the satellite device may receive data packets from the user device (e.g., on channel 1) at a same time as transmitting data packets to the master device (e.g., on channel 2) and/or as receiving data packets from the master device (e.g., on channel 3), the satellite device may transmit data packets to the user device (e.g., on channel 1) at a same time as transmitting data packets to the master device (e.g., on channel 2) and/or as receiving data packets from the master device (e.g., on channel 3), the master device may receive data packets from the satellite device (e.g., on channel 2) at a same time as transmitting data packets to the satellite device (e.g., on channel 3) and/or the like.

In some implementations, channel 1 through channel 5 in the example illustrated in FIGS. 1A-1L may be associated with non-overlapping wireless channels such that any particular frequency is not included in more than one of the wireless channels associated with channels 1 through 5 in the example illustrated in FIGS. 1A-1L. In some implementations, one or more of channel 1 through channel 5 in the example illustrated in FIGS. 1A-1L may be included in different RF ranges. For example, channel 2 may be included in the 2.4 GHz RF range, and channel 3 may be included in the 5 GHz RF band, and so on. In some implementations, a satellite device and/or the master device may implement different wireless channels using a plurality of antennas. For example, satellite device 1 may implement channel 1 using one or more transceiver antennas, may implement channel 2 using one or more transmitter antennas, and/or may implement channel 3 using one or more receiver antennas, where the one or more transceiver antennas, the one or more transmitter antennas, and the one or more receiver antennas are each different antennas.

Figure 1B:
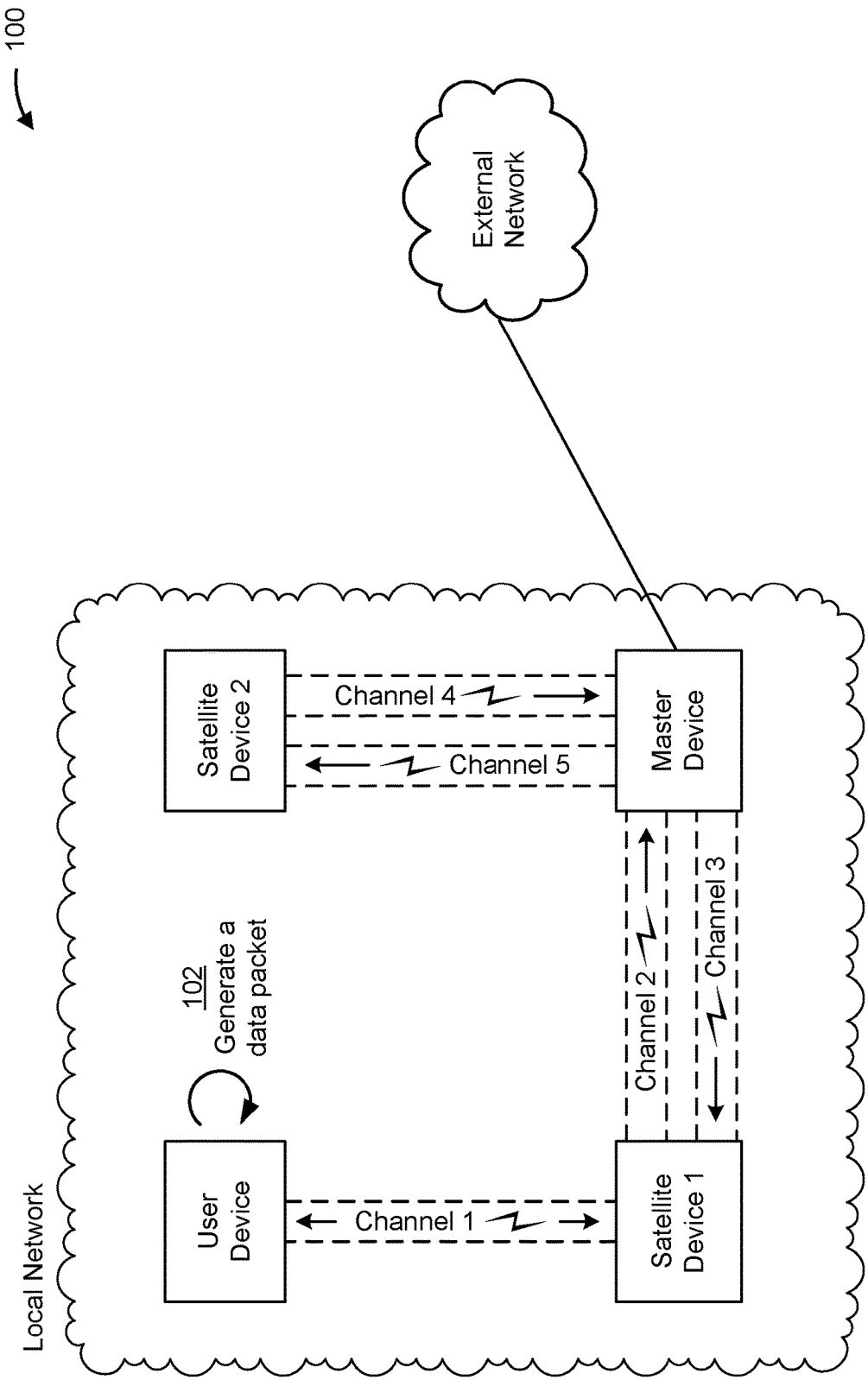

Turning now to FIG. 1B, and as shown by reference number 102, the user device may generate a data packet that is to be transmitted to the external network. In some implementations, the user device may automatically generate the data packet. For example, the user device may automatically generate the data packet to back up data stored on the user device (e.g., to a cloud server in the external network). In some implementations, the user device may generate the data packet based on input provided by a user. For example, a user may instruct the user device to send an email, to upload a file to a server in the external network, and/or the like. As another example, the user may interact with an application installed on the user device, and the user device may generate the data packet based on the user's interaction with the application.

In some implementations, when generating the data packet, the user device may include, in a header of the data packet, information associated with a wireless link between the user device and a satellite device included in the local network (e.g., satellite device 1). For example, the wireless link between the user device and satellite device 1 may be a half-duplex link based on a half-duplex protocol, such as IEEE 802.11. Accordingly, the information included in the header of the data packet may include information associated with the half-duplex protocol. As an example, the information associated with the half-duplex protocol may include a power management field (e.g., a field that includes information identifying a power management state associated with a device transmitting a data packet, such as an active state, an idle state, an asleep state, etc.), a quality of service (QoS) control field for (e.g., a field that includes information identifying an airtime priority for a data packet, information identifying whether a receiver of the packet is to send an acknowledgement when receiving the data packet, etc.), a frame control field (e.g., a field that includes information identifying a type of packet being transmitted (e.g., data packet, control packet, etc.), privacy information, etc.), a sequence control field for (e.g., a field that includes information associated with a sequence of data packets being transmitted), and/or the like.

Figure 1C:
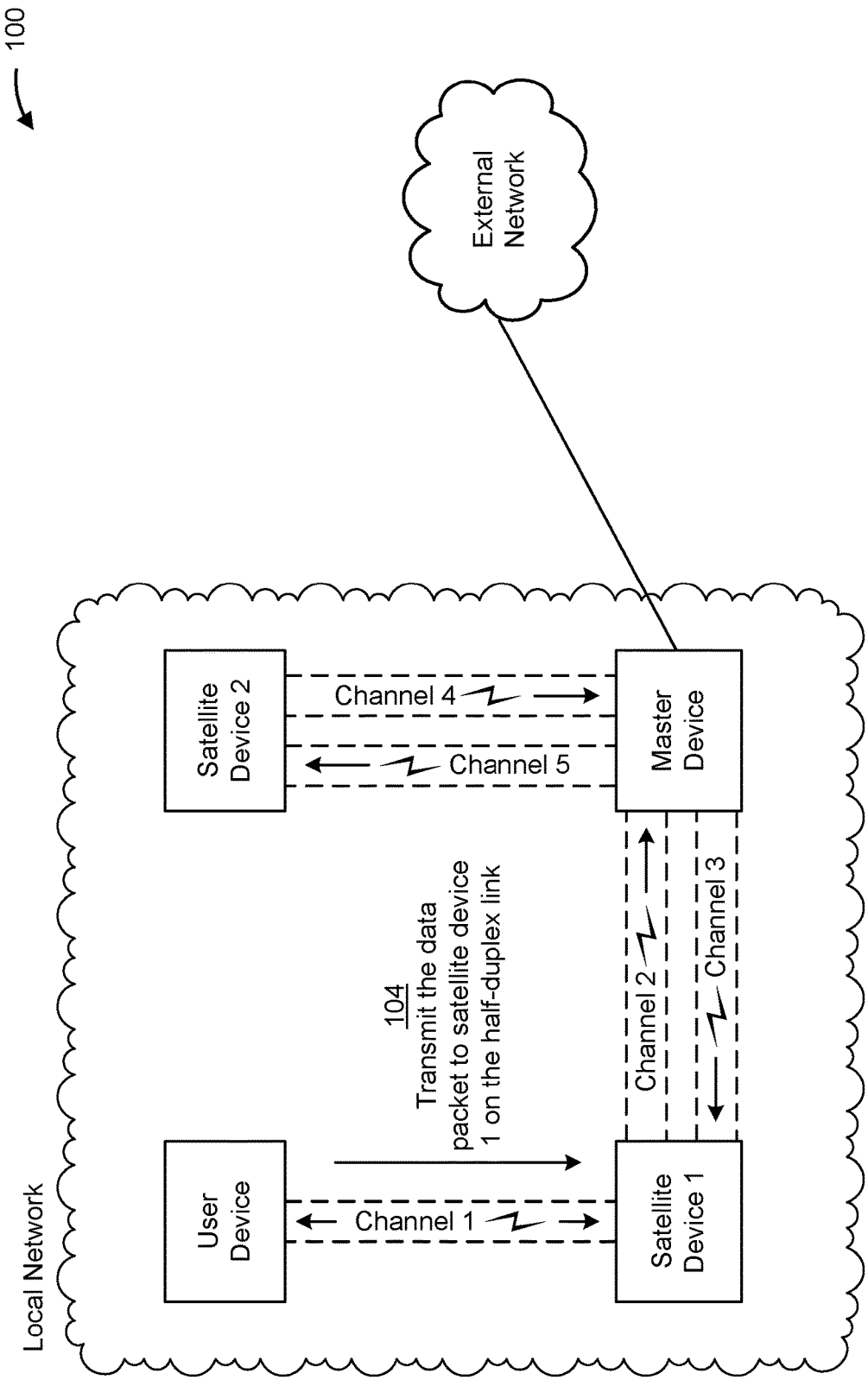

Turning now to FIG. 1C, and as shown by reference number 104, the user device may transmit the data packet to satellite device 1 on the half-duplex link. For example, the user device may transmit the data packet to satellite device 1 on a wireless channel (e.g., channel 1) associated with the half-duplex link. In some implementations, the user device may transmit the data packet to satellite device 1 by scheduling a time to transmit the data packet on channel 1 of the half-duplex link so that satellite device 1 does not transmit to the user device on channel 1 at the scheduled time, and transmitting the data packet to satellite device 1 on channel 1 of the half-duplex link during the scheduled time.

Figure 1D:
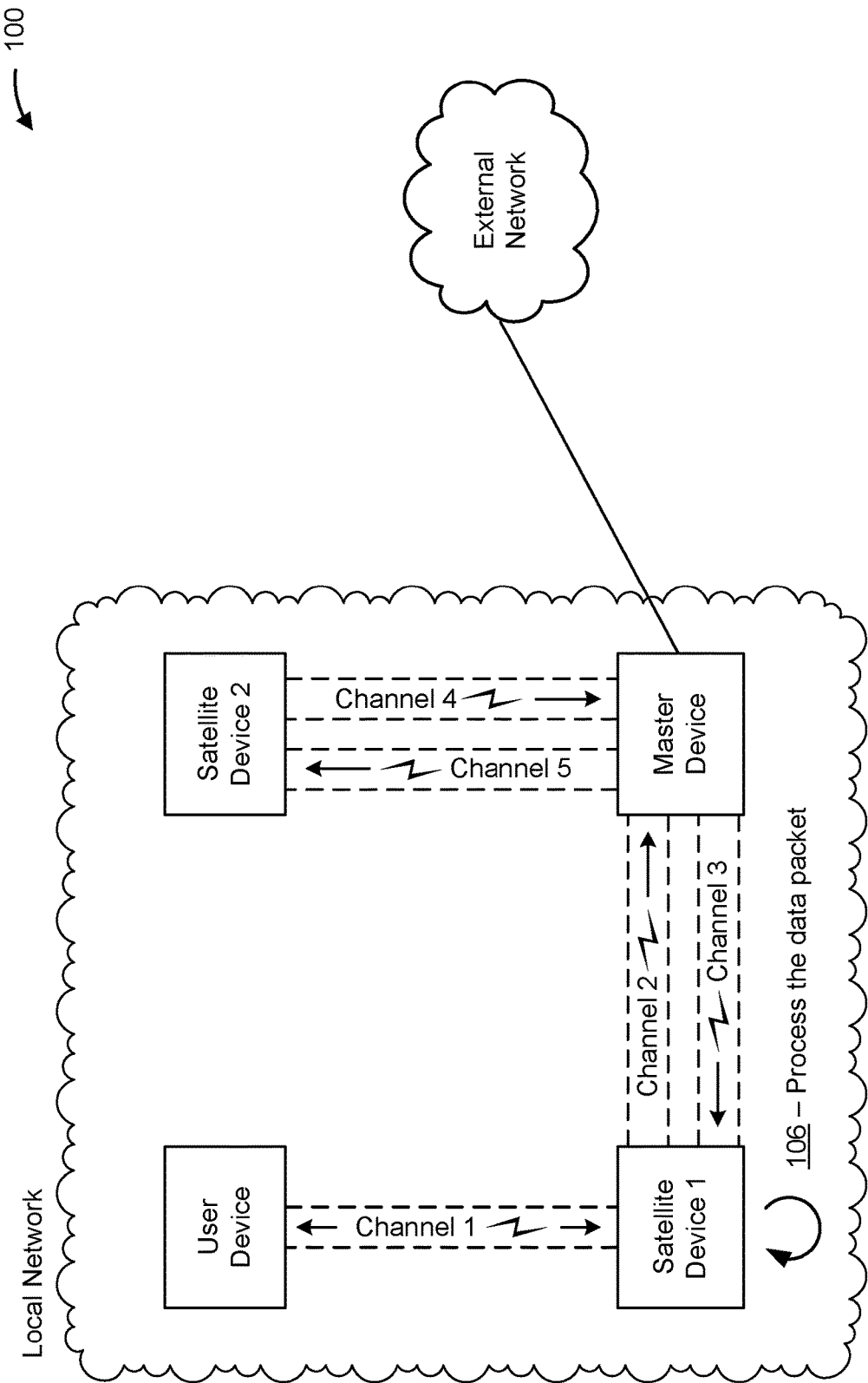

Turning now to FIG. 1D, satellite device 1 may receive the data packet from the user device on channel 1 of the half-duplex link. As shown by reference number 106, satellite device 1 may process the data packet. In some implementations, satellite device 1 will transmit the data packet to the master device on a wireless full-duplex link between satellite device 1 and the master device. Accordingly, satellite device 1 may not use the information associated with the half-duplex protocol included in the header of the data packet, and may therefore remove or scrub the information associated with the half-duplex protocol from the header of the data packet before transmitting the data packet to the master device on the wireless full-duplex link. In this way, satellite device 1 reduces the size of data packets transmitted on the wireless full-duplex link between satellite device 1 and the master device, which reduces the amount of data transmitted on the wireless full-duplex link, increases the efficiency of transmitting data packets on the wireless full-duplex link, increases throughput on the wireless full-duplex link, and decreases latency on the wireless full-duplex link.

In some implementations, satellite device 1 may further process the data packet by compressing the data packet using various compression techniques, such as a Lempel-Ziv compression algorithm (e.g., LZ77, LZ78, Lempel-Ziv-Welch (LZW), Lempel-Ziv-Storer-Szymanski (LZSS), Lempel-Ziv-Markov (LZMA), etc.), 125 high-speed compression, context tree weighting (CTW), Tunstall coding, and/or the like.

In some implementations, to process the data packet, satellite device 1 may place the data packet in a processing queue. In some implementations, the processing queue may be a first-in-first-out (FIFO) queue, may be prioritized based on information included in a QoS control field in a header of one or more data packets included in the queue, and/or the like.

Figure 1E:
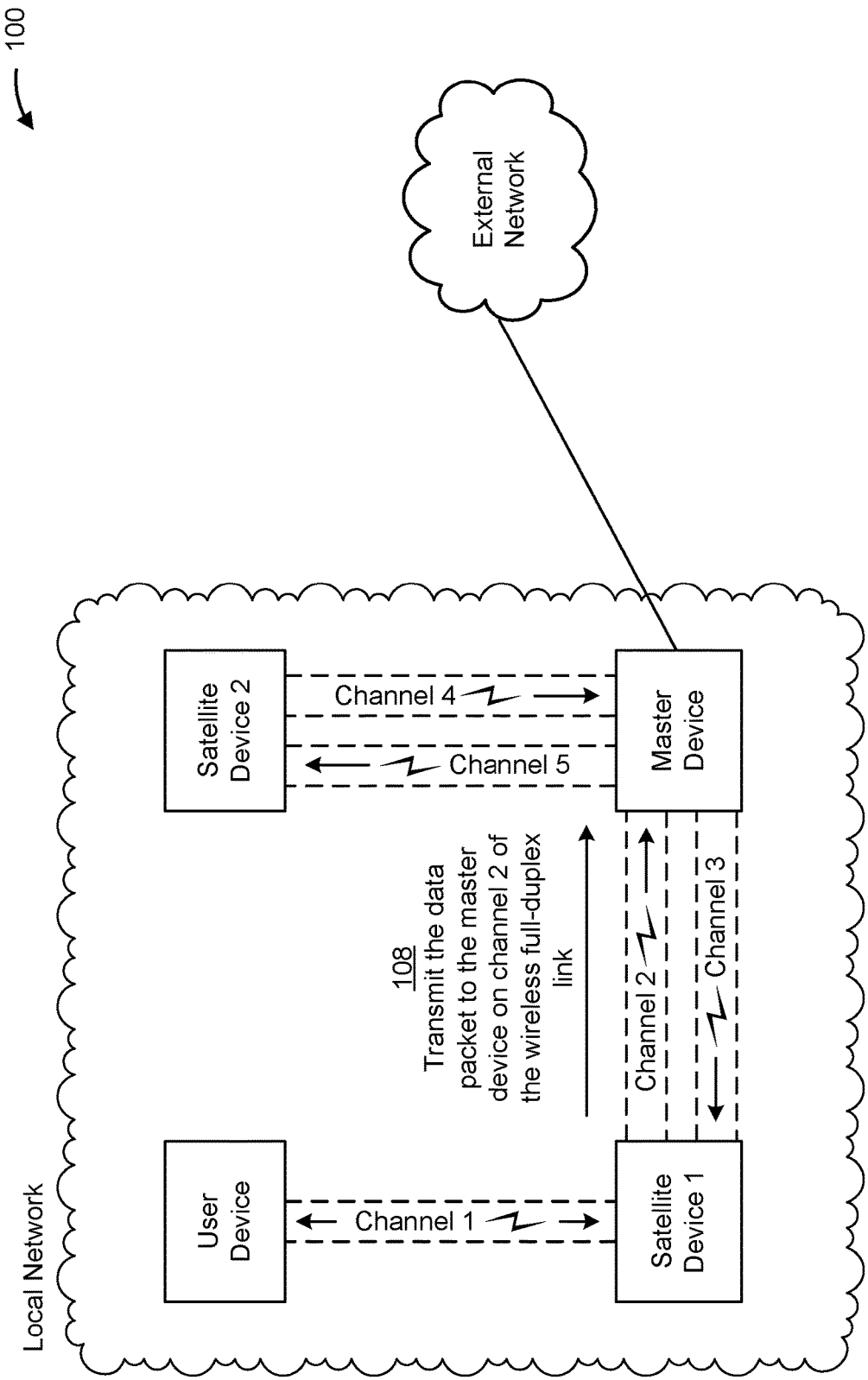

Turning now to FIG. 1E, and as shown by reference number 108, satellite device 1 may transmit the data packet to the master device on the wireless full-duplex link between satellite device 1 and the master device after processing the data packet. In some implementations, satellite device 1 may transmit the data packet to the master device on a wireless channel (e.g., channel 2) of the wireless full-duplex link. In some implementations, since channel 2 and channel 3 of the wireless full-duplex link are each associated with a different RF range (and thus do not share airtime), satellite device 1 may transmit the data packet to the master device on channel 2 while the master device transmits another data packet to satellite device 1 on channel 3. In this way, data packets may be transmitted from satellite device 1 to the master device with other data packets being transmitted from the master device to satellite device 1, which reduces the amount of time the master device and satellite device 1 spend waiting for airtime resources to become available for transmitting data packets, increases throughput on the wireless full-duplex link, and reduces latency on the wireless full-duplex link.

Figure 1F:
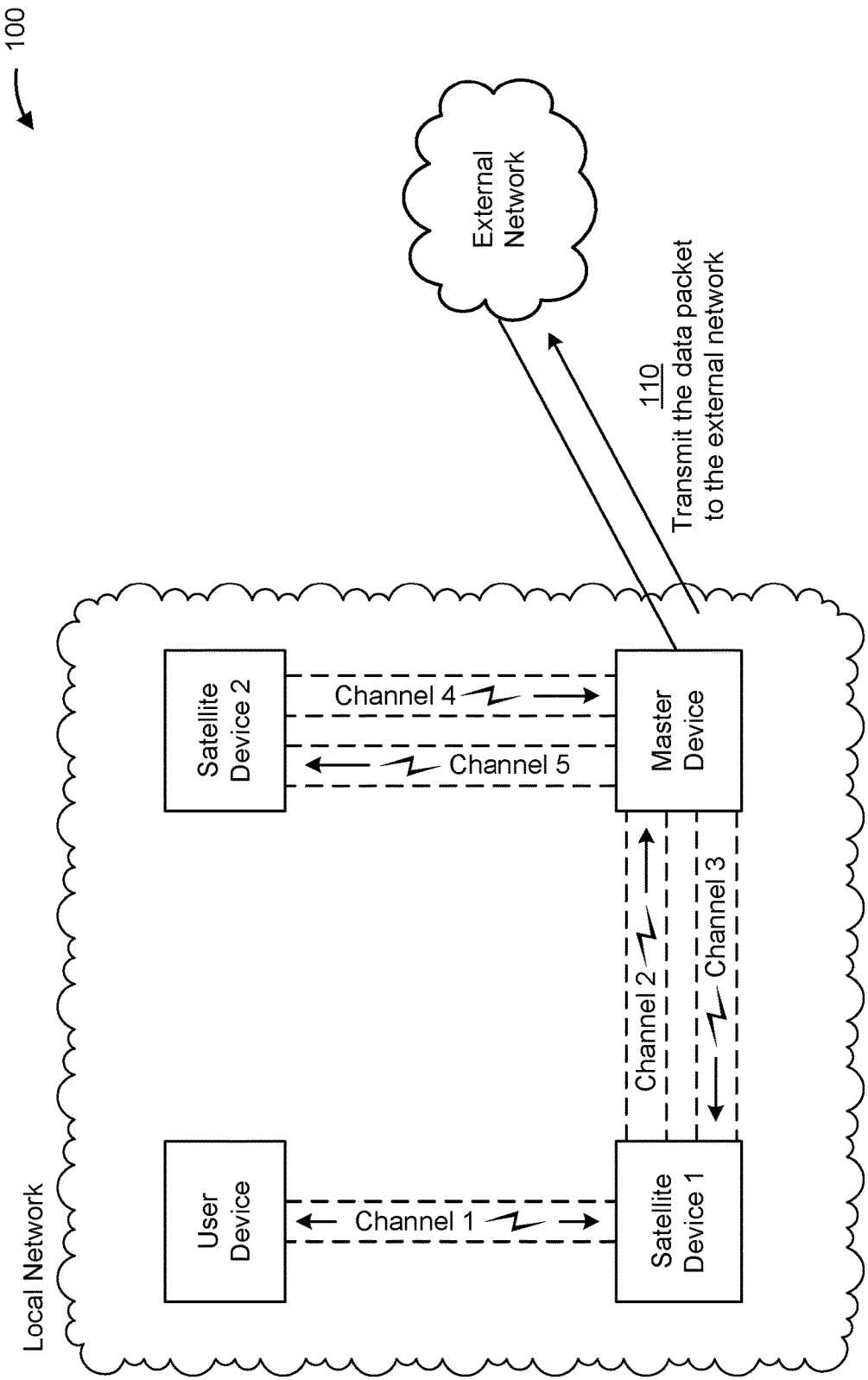

Turning now to FIG. 1F, the master device may receive the data packet from satellite device 1 on channel 2 of the wireless full-duplex link between the master device and satellite device 1. As shown by reference number 110, the master device may transmit the data packet to the external network based on receiving the data packet. In some implementations, the master device may transmit the data packet to the external network on a wired and/or wireless link. In some implementations, the master device may transmit the data packet to another network device included in the local network (e.g., a router, a hub, a gateway, a firewall, etc.)

which transmits the data packet to the external network. In some implementations, the data packet may be transmitted to another user device in the external network, a server device in the external network, and/or the like. In some implementations, a device in the external network may receive the data packet and may further transmit the data packet to another device in the external network, to another device included in another external network, and/or the like.

Figure 1G:
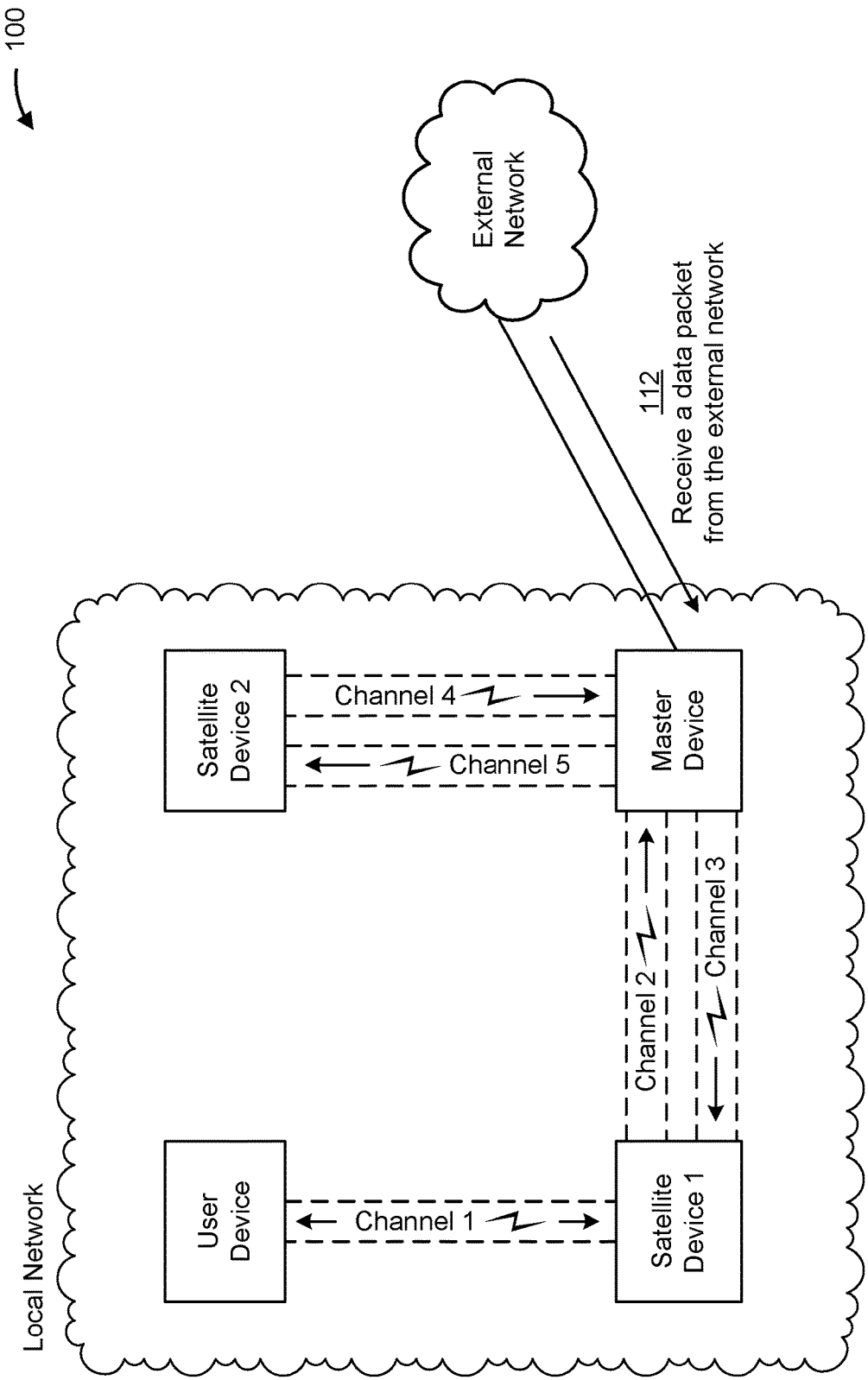

Turning now to FIG. 1G, the local network may receive a data packet, destined for the user device, from the external network. For example, the local network may receive the data packet from a device included in the external network, from a device included in another external network (which transmits the data packet to the user device via the external network), and/or the like. In some implementations, the local network may receive the data packet based on the user device transmitting another data packet to the external network.

As shown by reference number 112, the master device may receive the data packet, destined for the user device, from the external network. For example, the master device may receive the data packet from the external network on a wired and/or wireless link. In some implementations, another network device included in the local network (e.g., a router, a hub, a gateway, a firewall, etc.) may receive the data packet from the external network, and may transmit the data packet to the master device.

Figure 1H:
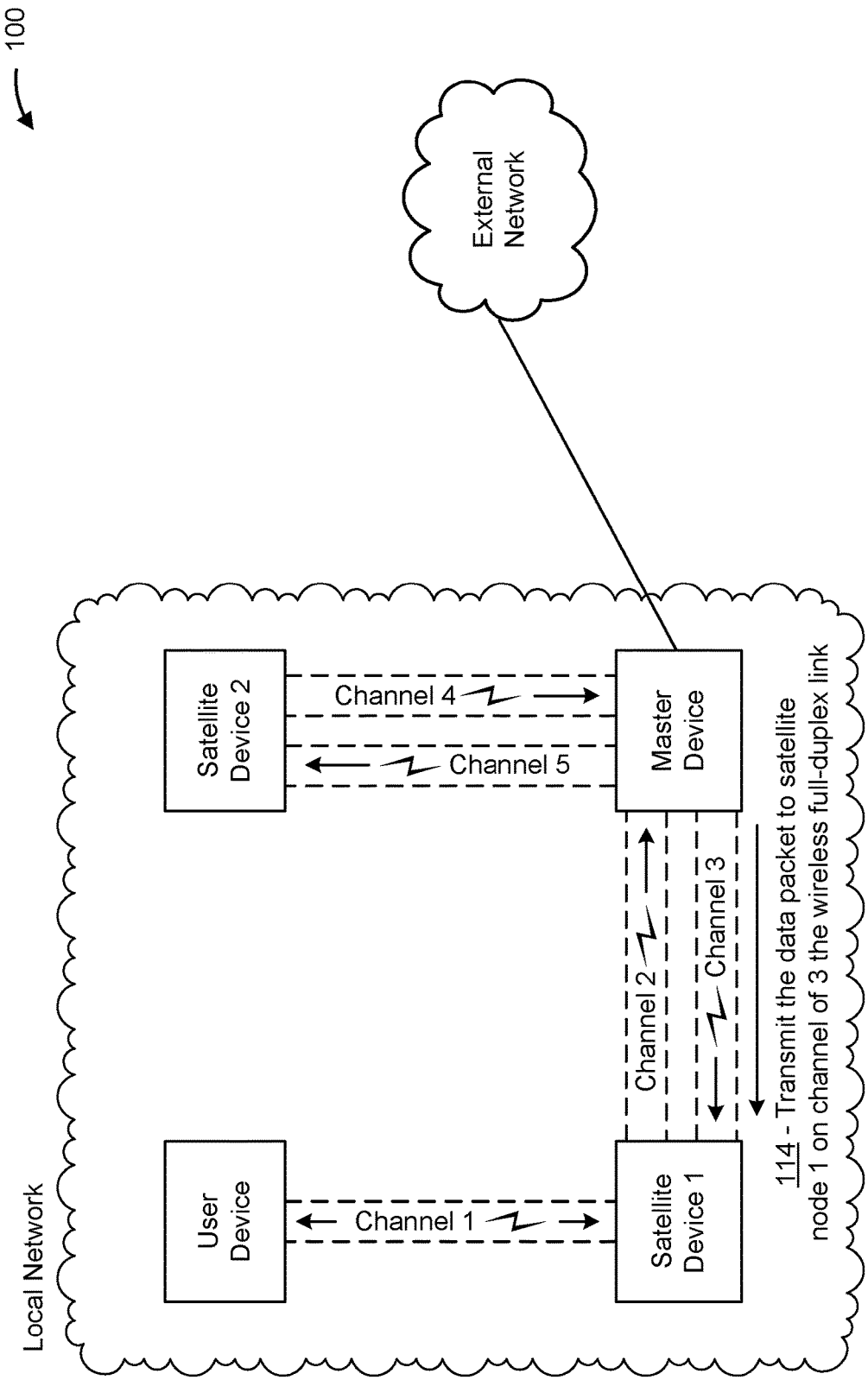

Turning now to FIG. 1H, and as shown by reference number 114, the master device may transmit the data packet to a satellite device included in the local network (e.g., satellite device 1). In some implementations, the master device may transmit the data packet to satellite device 1 on a wireless channel (e.g., channel 3) of a wireless full-duplex link between satellite device 1 and the master device. In some implementations, since channel 2 and channel 3 of the wireless full-duplex link are each associated with a different wireless channel (and/or different non-overlapping wireless channels and/or different RF ranges) (and thus do not share airtime), the master device may transmit the data packet to satellite device 1 on channel 3 while satellite device 1 transmits another data packet to the master device on channel 2. In this way, data packets may be transmitted from the master device to satellite device 1 with other data packets being transmitted from satellite device 1 to the master device, which reduces the amount of time the master device and satellite device 1 spend waiting for airtime resources to become available for transmitting data packets, increases throughput on the wireless full-duplex link, and reduces latency on the wireless full-duplex link.

Figure 1I:
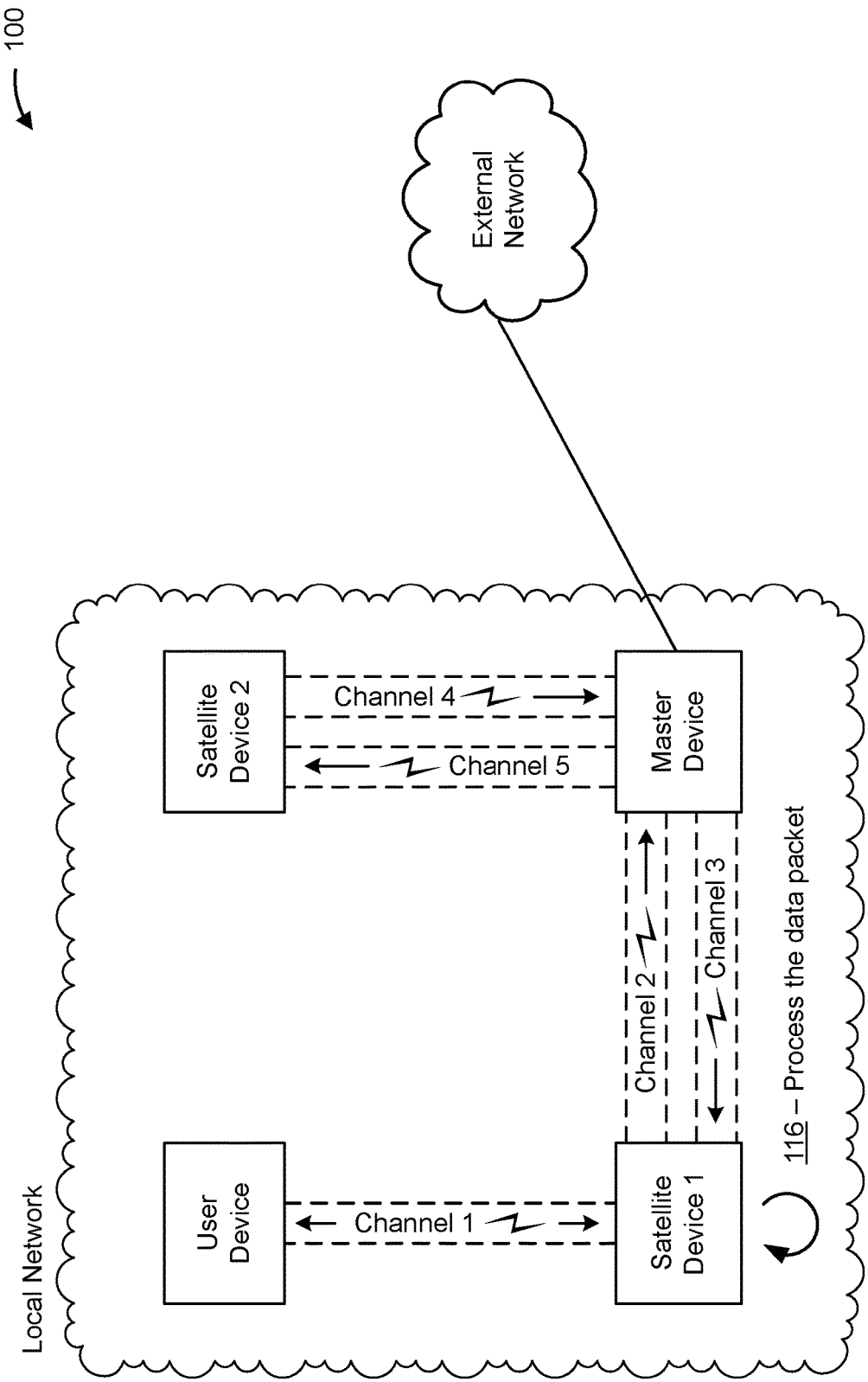

Turning now to FIG. 1I, satellite device 1 may receive the data packet from the master device on channel 3 of the wireless full-duplex link between satellite device 1 and the master device. As shown by reference number 116, satellite device 1 may process the data packet based on receiving the data packet. Since satellite device 1 will transmit the data packet to the user device over a half-duplex link, satellite device 1 may process the data packet by including half-duplex protocol information in a header of the data packet. In some implementations, satellite device 1 may place the data packet in a processing queue, and may process the data packet from the queue by adding the half-duplex protocol information, to the header of the data packet, described above. In this way, satellite device 1 can support wireless half-duplex and wireless full-duplex communication. Moreover, in this way, satellite device 1 may allow the user device to share airtime on a wireless channel of the half-duplex link (e.g., channel 1) with other user devices in the local network.

Further, in this way, satellite device 1 and the master device enable the wireless full-duplex link to operate more efficiently by transmitting data packets on the wireless full-duplex link without including half-duplex protocol information in a header of the data packets.

Figure 1J:
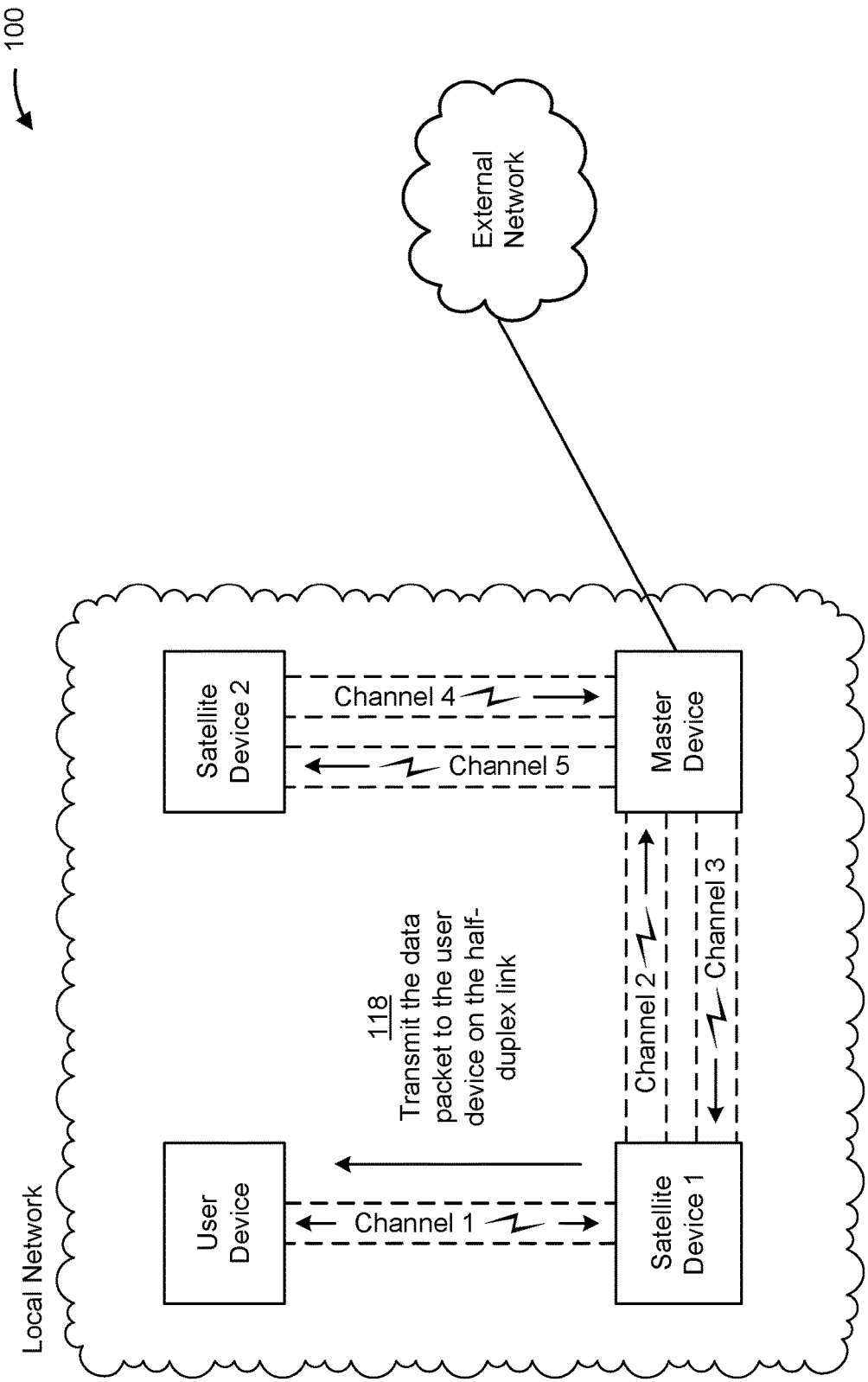

Turning now to FIG. 1J, and as shown by reference number 118, satellite device 1 may transmit the data packet to the user device after processing the data packet. In some implementations, satellite device 1 may transmit the data packet on channel 1 of the half-duplex link between satellite device 1 and the user device. For example, satellite device 1 may transmit the data packet to the user device by scheduling a time to transmit the data packet on channel 1 of the half-duplex link so that the user device does not transmit to satellite device 1 on channel 1 at the scheduled time, and transmitting the data packet to the user device on channel 1 of the half-duplex link during the scheduled time.

Figure 1K:
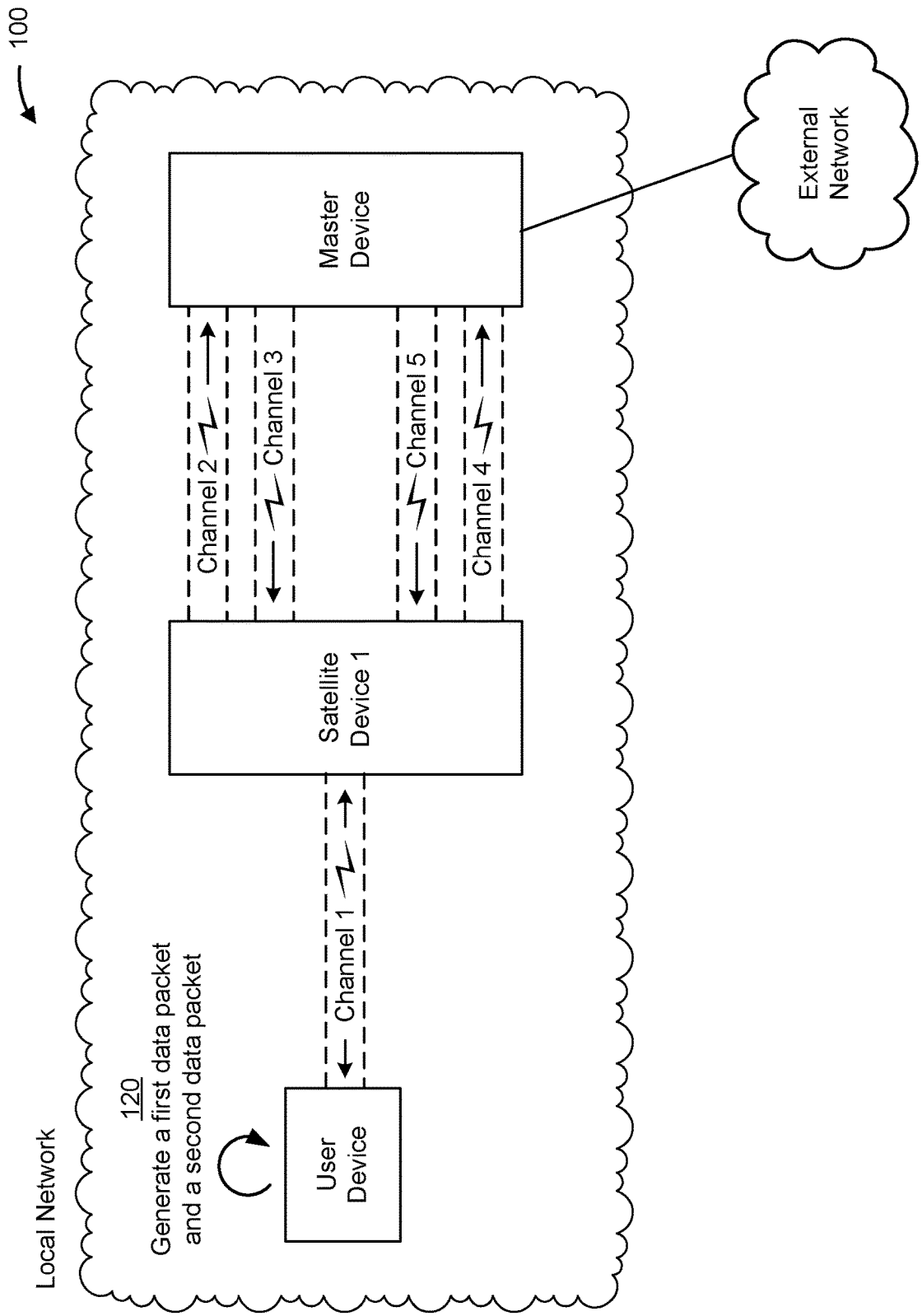

Turning now to FIG. 1K, in some implementations, a satellite device (e.g., satellite device 1) and the master device may be communicatively connected via a plurality of wireless full-duplex links. For example, as shown in FIG. 1K, satellite device 1 and the master device may be communicatively connected via a wireless first full-duplex link including a first plurality of wireless channels (e.g., channel 2 and channel 3), and may be communicatively connected via a second wireless full-duplex link including a second plurality of wireless channels (e.g., channel 4 and channel 5). In some implementations, channel 1 through channel 5 in the example illustrated in FIGS. 1K-1O may each be associated with a different wireless channel such that channel 1 through channel 5 in the example illustrated in FIGS. 1K-1O do not share airtime resources for transmitting and/or receiving data packets. In some implementations, channel 1 through channel 5 in the example illustrated in FIGS. 1K-1O may each be associated with a different non-overlapping wireless channel. In some implementations, channel 1 through channel 5 in the example illustrated in FIGS. 1K-1O may each be associated with a different RF range. While FIGS. 1K-1O illustrate channels 1 through 5, the quantity of channels is an example, and a greater or fewer quantity of channels may be included.

In some implementations, the first wireless full-duplex link and the second wireless full-duplex link may be used for various purposes. In some implementations, satellite device 1 and/or the master device may use the first wireless full-duplex link and the second wireless full-duplex link to increase throughput and reduce latency on the connection between satellite device 1 and the master device. For example, satellite device 1 may transmit data packets on channel 2 of the first wireless full-duplex link at a same time as transmitting data packets on channel 4 of the second wireless full-duplex link, may receive data packets on channel 3 of the first wireless full-duplex link at a same time as receiving data packets on channel 5 of the second wireless full-duplex link, may transmit data packets on channel 2 of the first wireless full-duplex link and on channel 4 of the second wireless full-duplex link at a same time as receiving data packets on channel 3 of the first wireless full-duplex link and on channel 5 of the second wireless full-duplex link, and/or the like.

In some implementations, satellite device 1 and the master device may use the first wireless full-duplex link and the second wireless full-duplex link for redundancy, which may improve reliability and decrease downtime on the connection between satellite device 1 and the master device. For example, the first wireless full-duplex link may be used as a primary wireless full-duplex link, and the second wireless full-duplex link may be used as a backup wireless full-duplex link. Accordingly, if a fault occurs on the first wireless full-duplex link, satellite device 1 and the master device may switch communication over to the second wireless full-duplex link to mitigate the fault on the first wireless full-duplex link.

In some implementations, satellite device 1 and the master device may dynamically use the first wireless full-duplex link and the second wireless full-duplex link to accommodate changes in bandwidth usage between satellite device 1 and the master device. For example, the first wireless full-duplex link may be a primary wireless full-duplex link maintained in an active state, and the second wireless full-duplex link may be a secondary wireless full-duplex link that is maintained in a deactivated state. Satellite device 1 and/or the master device may switch the second wireless full-duplex link to an active state, such that satellite device 1 and/or the master device may transmit and/or receive data packets on both the first wireless full-duplex link and the second wireless full-duplex link, based on determining that bandwidth usage on the first wireless full-duplex link satisfies a bandwidth usage threshold. In some implementations, the bandwidth usage threshold may be based on a particular transfer rate on the first wireless full-duplex link (e.g., 500 Mb/s, 800 Mb/s, etc.), based on a percentage of the available bandwidth on the first wireless full-duplex link (e.g., 60% of the available bandwidth, 80% of the available bandwidth, etc.), and/or the like. In some implementations, each wireless channel of the first wireless full-duplex link may be associated with a respective bandwidth usage threshold. For example, channel 2 may be associated with a first bandwidth usage threshold and channel 3 may be associated with a second bandwidth usage threshold. In some implementations, a portion of the second wireless full-duplex link may be activated based on one or more of the first bandwidth usage threshold or the second bandwidth usage threshold being satisfied. For example, satellite device 1 and/or the master device may determine that bandwidth usage on channel 2 satisfies the first bandwidth usage threshold and that bandwidth usage on channel 3 does not satisfy the second bandwidth usage threshold, and may activate channel 4 (i.e., a wireless channel on which data packets travel in the same direction as channel 2) and maintain channel 5 in the deactivated state based on determining that the bandwidth usage on channel 2 satisfies the first bandwidth usage threshold.

In some implementations, satellite device 1 and/or the master device may dynamically establish additional wireless full-duplex links and/or disconnect established wireless full-duplex links to accommodate the changes in bandwidth usage. For example, the first wireless full-duplex link may be maintained in a connected and active state, and satellite device 1 and/or the master device may establish the second wireless full-duplex link based on determining that bandwidth usage on the first wireless full-duplex link satisfies the bandwidth usage threshold. As another example, satellite device 1 and/or the master device may disconnect the second wireless full-duplex link based on determining that bandwidth usage on the first wireless full-duplex link and/or the second wireless full-duplex link does not satisfy the bandwidth usage threshold, based on determining that the bandwidth usage on the first wireless full-duplex link does not satisfy a first bandwidth usage threshold and/or determining that the bandwidth usage on the second wireless full-duplex link does not satisfy a second bandwidth usage threshold, and/or the like.

As shown by reference number 120, to transmit a plurality of data packets to an external network, a user device may generate a first data packet and a second data packet. Since the user device is to transmit the first data packet and the second data packet over a half-duplex link between the user device and satellite device 1, the user device may include half-duplex protocol information, described above, in a header of the first data packet and the second data packet.

Figure 1L:
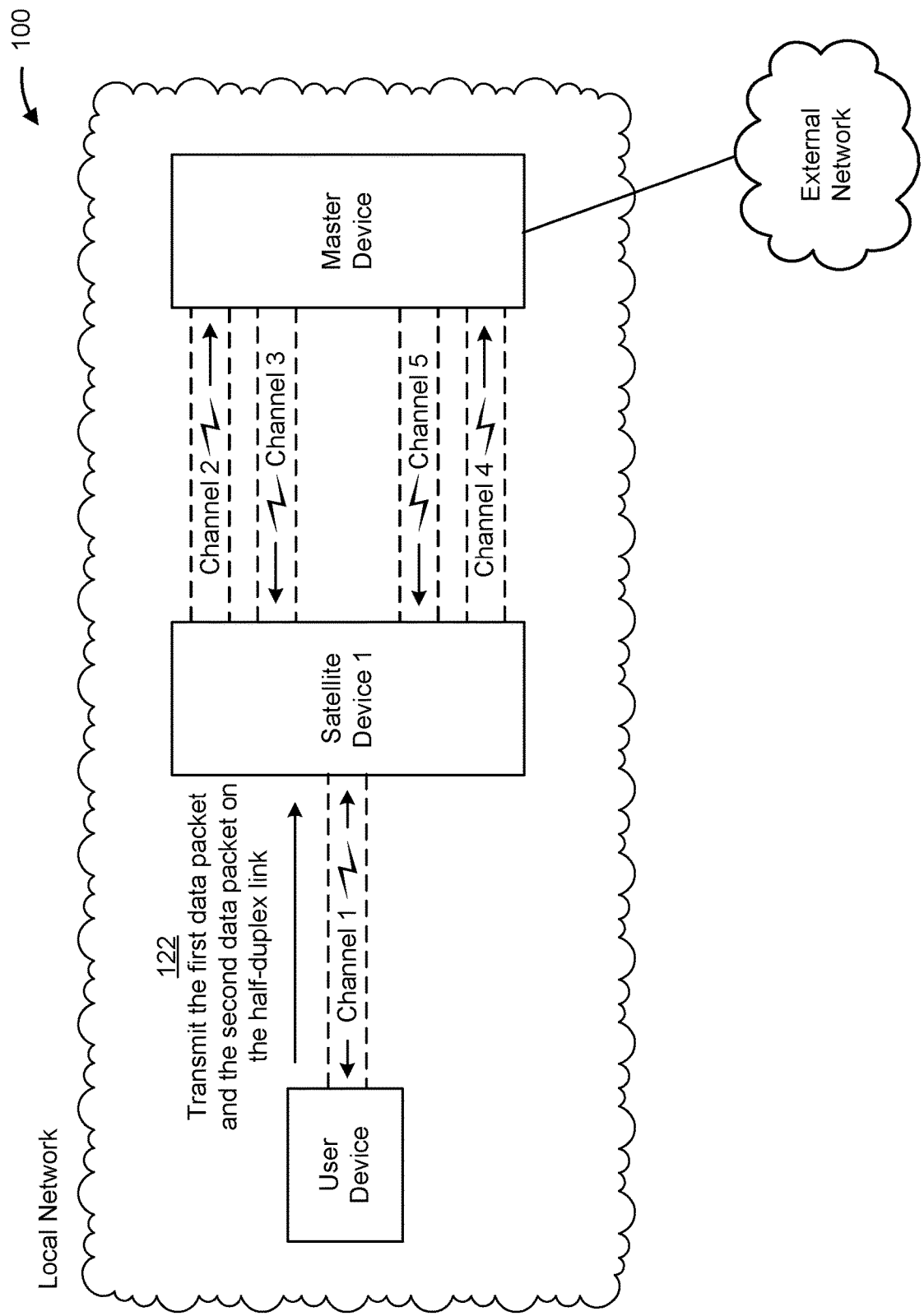

Turning now to FIG. 1L, and as shown by reference number 122, the user device may transmit the first data packet and the second data packet to satellite device 1 on the half-duplex link. For example, the user device may transmit the first data packet and the second data packet on a wireless channel (e.g., channel 1) associated with the half-duplex link. In some implementations, the user device may transmit the first data packet and the second data packet to satellite device 1 by scheduling a first time to transmit the first data packet on channel 1 of the half-duplex link, and a second time to transmit the second data packet on channel 1 of the half-duplex link, so that satellite device 1 does not transmit to the user device on channel 1 during the scheduled first time and the scheduled second time. The user device may transmit the first data packet to satellite device 1 on channel 1 of the half-duplex link during the scheduled first time, and may transmit the second data packet to satellite device 1 on channel 1 of the half-duplex link during the scheduled second time.

Figure 1M:
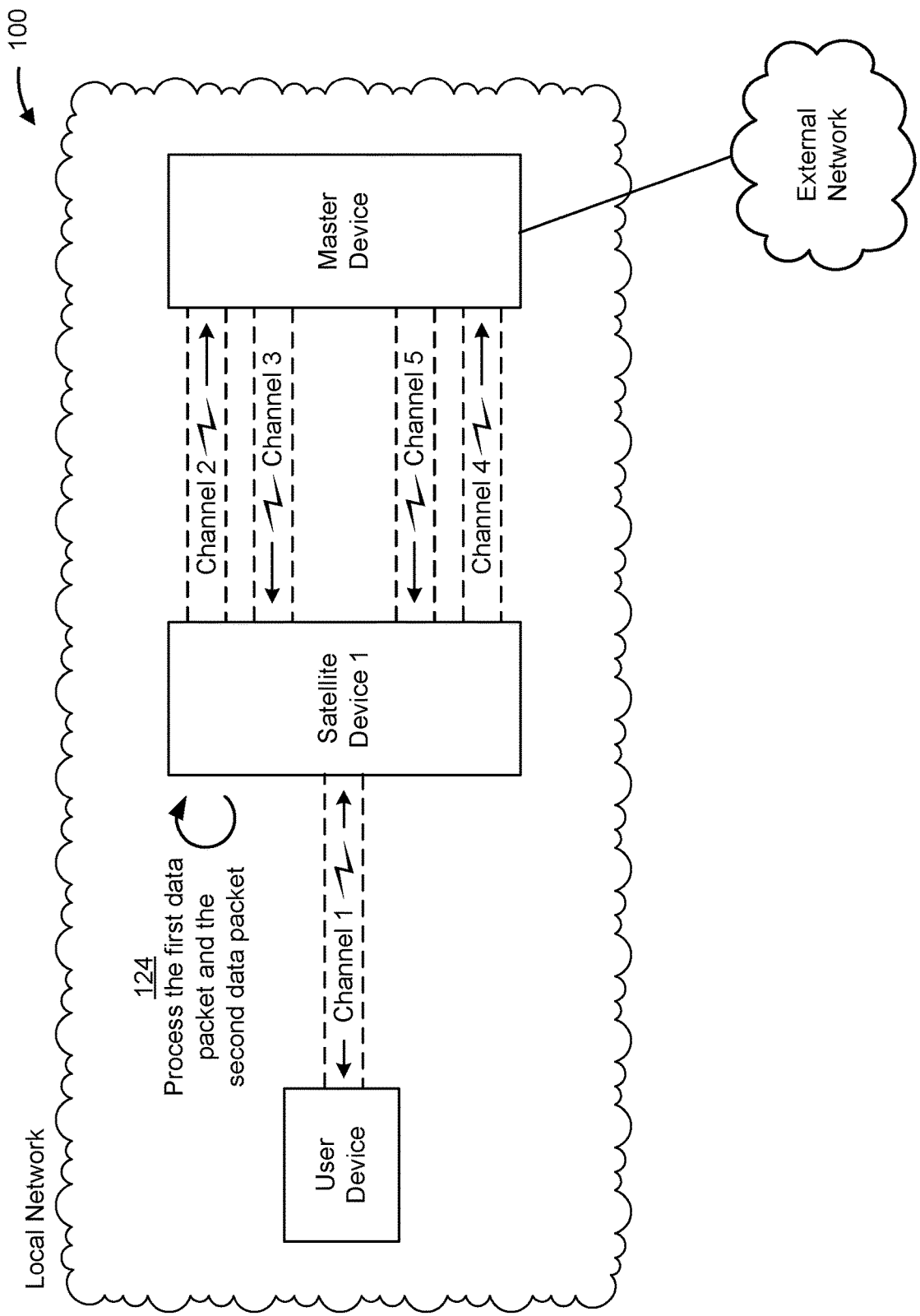

Turning now to FIG. 1M, satellite device 1 may receive, from the user device, the first data packet and the second data packet on channel 1 of the half-duplex link. As shown by reference number 124, satellite device 1 may process the first data packet and the second data packet based on receiving the first data packet and the second data packet from the user device. For example, satellite device 1 may remove or scrub the half-duplex protocol information from the header of the first data packet and/or the second data packet, may compress the first data packet and/or the second data packet, and/or the like, as described above. In this way, satellite device 1 reduces the size of data packets transmitted on the wireless full-duplex link between satellite device 1 and the master device, which reduces the amount of data transmitted on the first wireless full-duplex link and the second wireless full-duplex link, which increases the efficiency of transmitting data packets on the first wireless full-duplex link and the second wireless full-duplex link, increases throughput on the first wireless full-duplex link and the second wireless full-duplex link, and decreases latency on the first wireless full-duplex link and the second wireless full-duplex link.

Figure 1N:
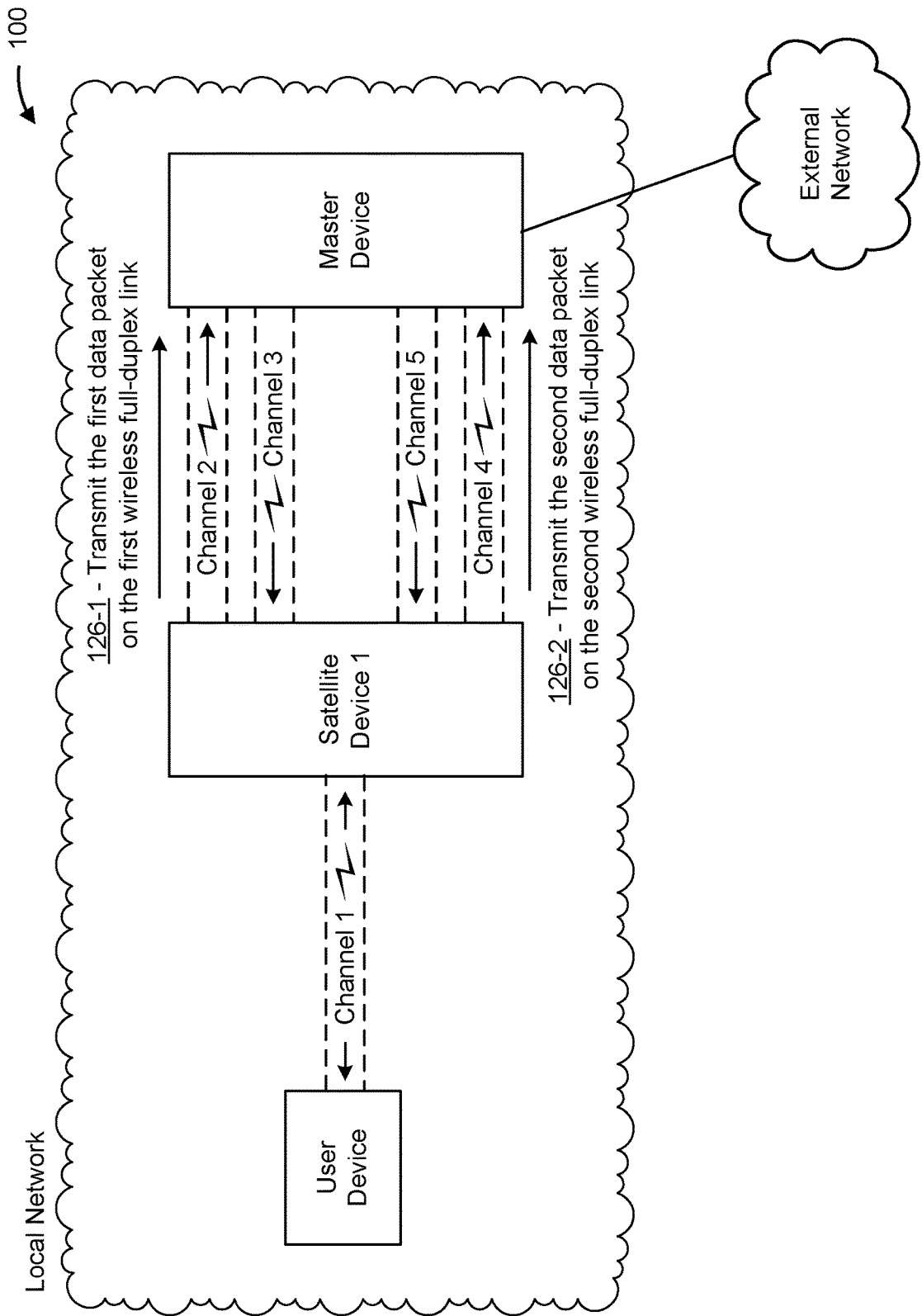
Figure 10:
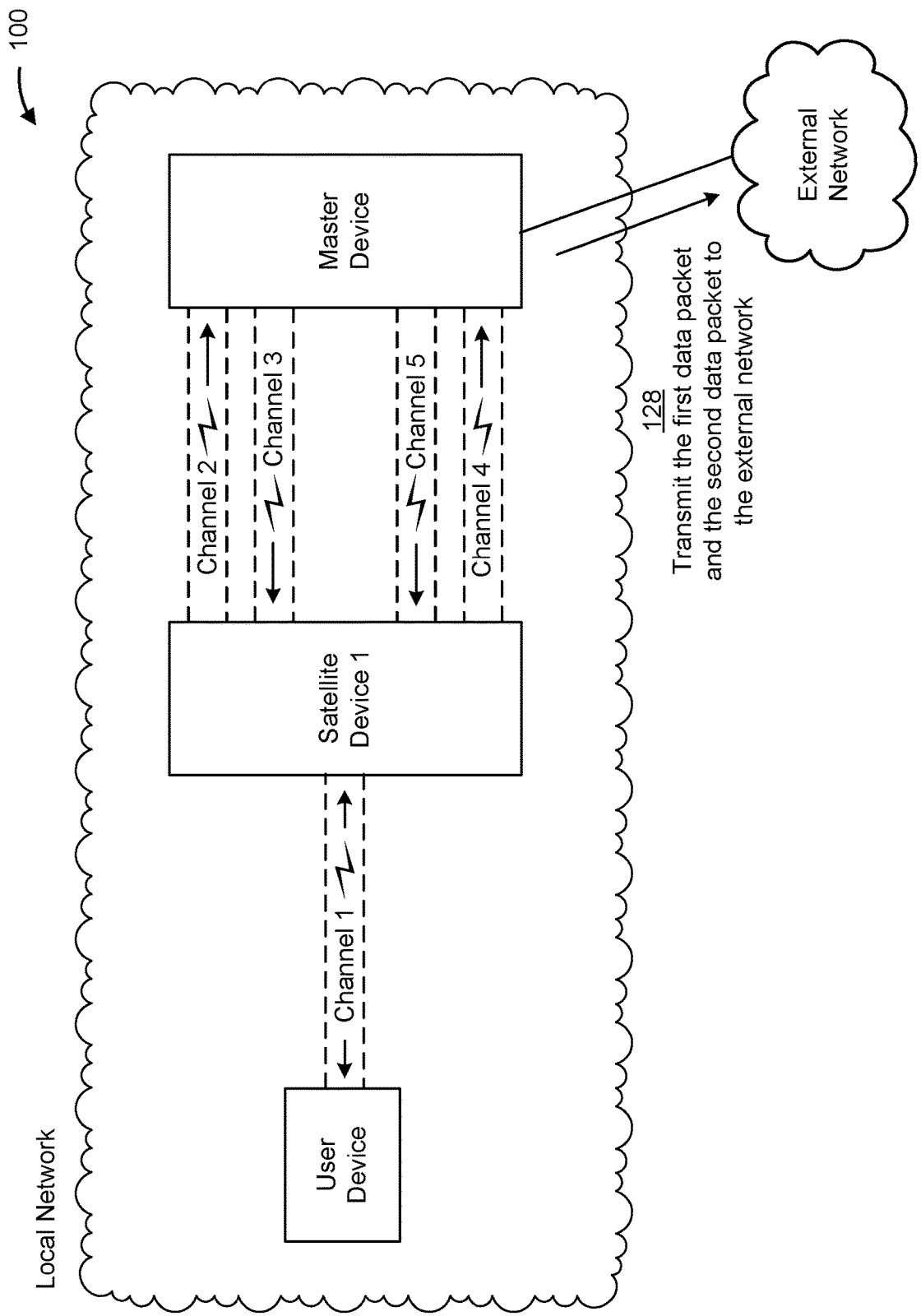

Turning now to FIG. 1N, and as shown by reference numbers 126-1 and 126-2, satellite device 1 may transmit the first data packet on channel 2 of the first full-duplex link (reference number 126-1) at a same time as transmitting the second data packet on channel 4 of the second full-duplex link (reference number 126-2) after processing the first data packet and the second data packet, at different times, and/or the like. In some implementations, satellite device 1 may transmit the first data packet on channel 2 of the first wireless full-duplex link at a same time as (or at different times) the master device transmits a third data packet on channel 3 of the first wireless full-duplex link, and/or satellite device 1 may transmit the second data packet on channel 4 of the second wireless full-duplex link at a same time as (or different times) the master device transmits a fourth data packet on channel 5 of the second wireless full-duplex link, and/or the like. In this way, satellite device 1 may transmit data packets to, and/or receive data packets from, the master device at the same time, which increases throughput and decreases latency between satellite device 1 and the master device.

Turning now to FIG. 1O, the master device may receive the first data packet on channel 2 of the first wireless full-duplex link, and may receive the second data packet on channel 4 of the second wireless full-duplex link. As shown by reference number 128, the master device may transmit the first data packet and the second data packet to the external network based on receiving the first data packet and the second data packet. In some implementations, the master device may transmit the data packet to the external network on a wired and/or wireless link. In some implementations, the master device may transmit the first data packet and the second data packet to another network device included in the local network (e.g., a router, a hub, a gateway, a firewall, etc.) which transmits the first data packet and the second data packet to the external network. In some implementations, the first data packet and the second data packet may be transmitted to one or more user devices in the external network, to one or more server devices in the external network, and/or the like. In some implementations, a device in the external network may receive the first data packet and/or the second data packet may further transmit the first data packet and/or the second data packet to another device in the external network, to another device included in another external network, and/or the like.

The number and arrangement of devices and networks shown in FIGS. 1A-1O are provided as an example. In practice, there may be additional devices and/or networks, fewer devices and/or networks, different devices and/or networks, or differently arranged devices and/or networks than those shown in FIGS. 1A-1O. Furthermore, two or more devices shown in FIGS. 1A-1O may be implemented within a single device, or a single device shown in FIGS. 1A-1O may be implemented as multiple, distributed devices. Additionally, or alternatively, a set of devices (e.g., one or more devices) of example implementation 100 may perform one or more functions described as being performed by another set of devices of example implementation 100.

Figure 2:
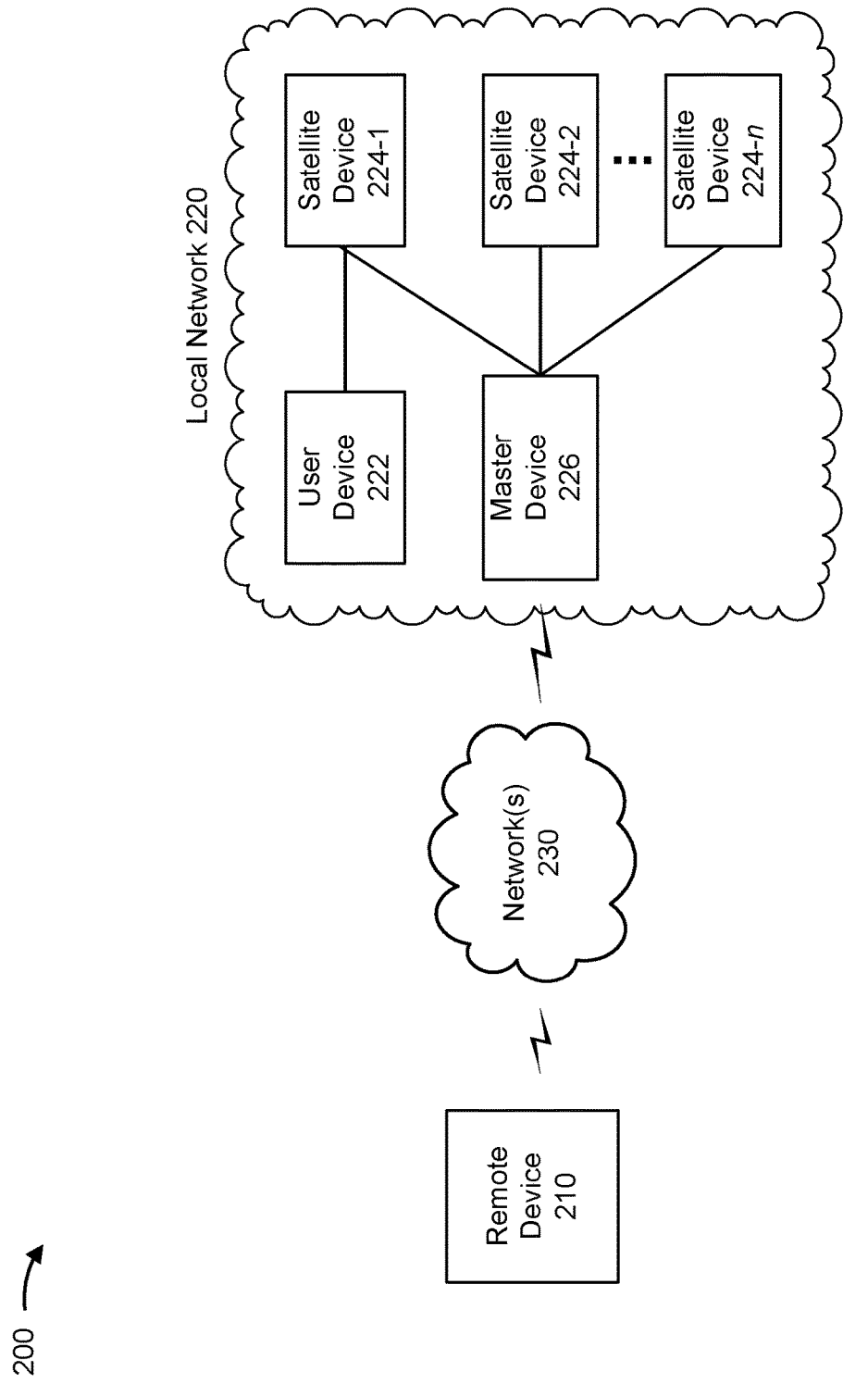
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a remote device 210, a local network 220, a user device 222, a plurality of satellite devices 224-1 through 224-n (individually referred to as "satellite device 224" and collectively referred to as ("satellite devices 224"), a master device 226, and one or more networks 230. Devices of environment 200 may interconnect via wired connections, wireless connections, or a combination of wired and wireless connections.

Remote device 210 includes one or more devices capable of communicating with user device 222 (e.g., via network(s) 230). In some implementations, remote device 210 may be a user device, such as a mobile phone (e.g., a smart phone, a radiotelephone, etc.), a laptop computer, a tablet computer, a handheld computer, a gaming device, a wearable communications device (e.g., a smart wristwatch, a pair of smart eyeglasses, etc.), a desktop computer, an IoT device, and/or the like. In some implementations, remote device 210 may be a server device, such as an application server, a data center, a virtual machine (VM) server, a cloud server, and/or the like.

Local network 220 is a wired and/or wireless LAN that includes user device 222, satellite devices 224, and master device 226, and/or other devices. In some implementations, local network 220 may be a home network, a campus network, an office network, and/or the like. In some implementations, local network 220 may be communicatively connected with network(s) 230 via one or more networking devices, such as a firewall, a router, a switch, a base station (e.g., a macrocell, a femtocell, a small cell, and/or the like), a gateway, and/or the like.

User device 222 includes one or more devices capable of communicating with remote device 210 (e.g., via network(s) 230), with satellite devices 224, and/or with master device 226. In some implementations, user device 222 may include devices similar to those described above in reference to remote device 210. In some implementations, user device 222 may communicate with other user devices, with satellite devices 224, and/or with master device 226 using various communications protocols and/or communications interfaces, such as Ethernet, Bluetooth, NFC, Zigbee, Z-wave, Wi-Fi (IEEE 802.11), and/or the like. In some implementations, user device 222 may communicate with remote device 210 through satellite devices 224 and/or master device 226.

Satellite devices 224 and master device 226 include one or more network devices that transmit information between multiple user devices 222 in local network 220 and between user device 222 and devices outside of local network 220, such as remote device 210. In some implementations, satellite devices 224 and master device 226 may include, for example, a firewall, a router, a switch, a base station (e.g., a macrocell, a femtocell, a small cell, and/or the like), a gateway, and/or the like. Satellite device 224 may receive data packets from user device 222 (e.g., on a half-duplex link), may process data packets (e.g., by removing half-duplex protocol information from the data packets, by adding half-duplex protocol information to the data packets, etc.), may transmit data packets to master device 226 (e.g., on a wireless full-duplex link), may receive data packets from master device 226 (e.g., on a wireless full-duplex link), may transmit data packets to user device 222 (e.g., on a half-duplex link), and/or the like.

Master device 226 may receive data packets from satellite device 224 (e.g., on a wireless full-duplex link), may transmit data packets to an external network, may receive data packets from an external network, may transmit data packets to satellite device 224 (e.g., on a wireless full-duplex link), and/or the like. In some implementations, master device 226 may receive data packets from satellite device 224, and may transmit data packets to satellite device 224, on multiple wireless full-duplex links.

Network(s) 230 includes one or more wired and/or wireless networks. For example, network(s) 230 may include a wireless telecommunications network (e.g., a code division multiple access (CDMA) network, a 3G network, a 4G/LTE network, a 5G/NR network, another type of next generation network, etc.), a public land mobile network (PLMN), a LAN, a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
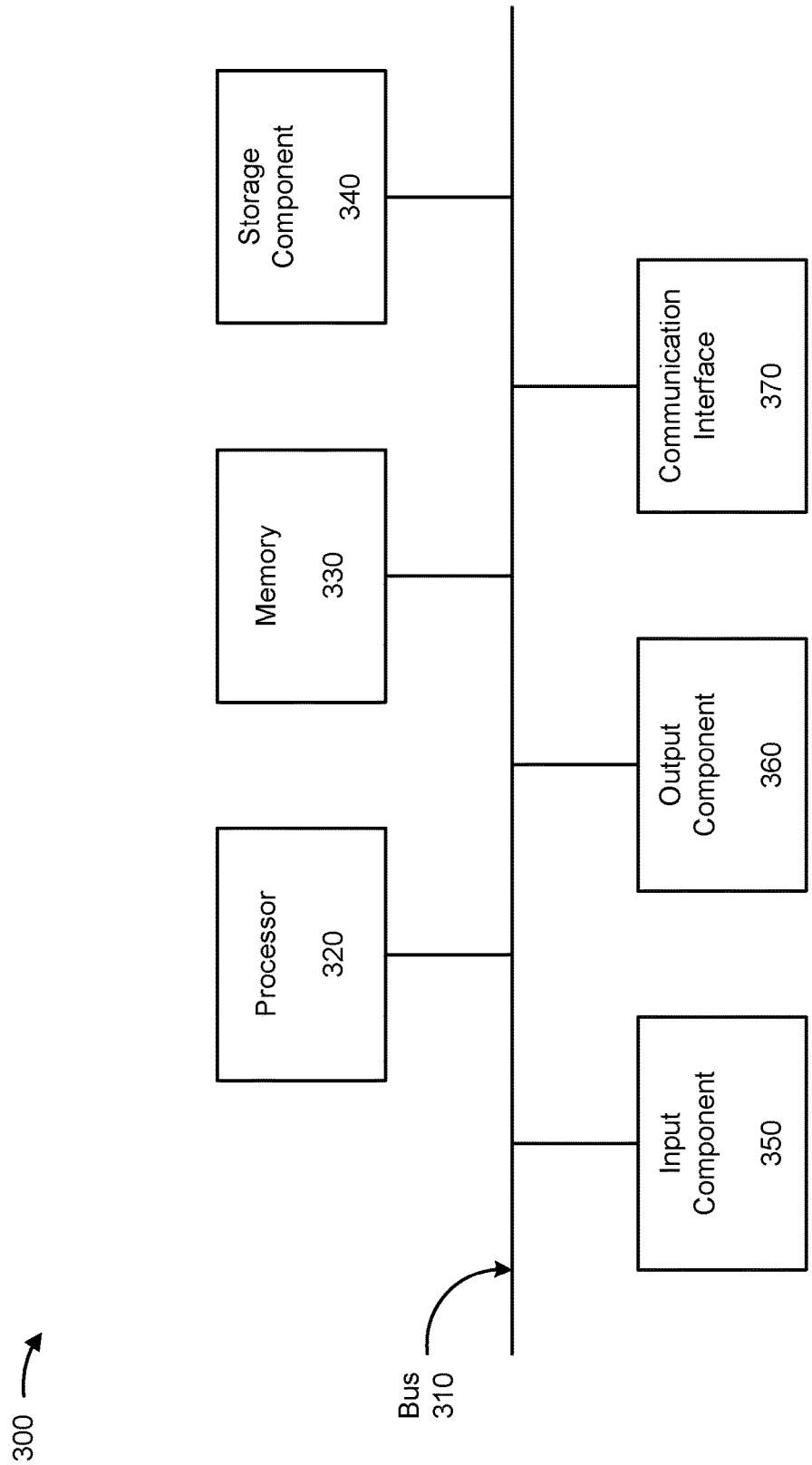
FIG. 3 is a diagram of example components of one or more devices of FIG. 2.

FIG. 3 is a diagram of example components of a device 300. Device 300 may correspond to remote device 210, user device 222, satellite devices 224, master device 226, and/or one or more devices included in network(s) 230. In some implementations, remote device 210, user device 222, satellite devices 224, master device 226, and/or the one or more devices included in network(s) 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, or the like. In some implementations, communication interface 370 may permit device 300 to transmit and/or receive information on a half-duplex link (e.g., by transmitting and/or receiving information on the same wireless channel) and/or a half-duplex link (e.g., by transmitting and/or receiving information on different wireless channels).

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for wireless backhaul in a local network. In some implementations, one or more process blocks of FIG. 4 may be performed by a first network device (e.g., satellite device 224). In some implementations, one or more process blocks of FIG. 4 may be performed by another device or a group of devices separate from or including the first network device, such as a user device (e.g., user device 222), a second network device (e.g., master device 226) and/or the like.

As shown in FIG. 4, process 400 may include receiving, from a user device, a data packet on a first wireless channel between the user device and the first network device (block 410). For example, the first network device (e.g., using processor 320, memory 330, storage component 340, input component 350, communication interface 370, and/or the like) may receive, from a user device, a data packet on a first wireless channel between the user device and the first network device, as described above in connection with FIGS. 1A-1O.

As further shown in FIG. 4, process 400 may include processing the data packet based on receiving the data packet (block 420). For example, the first network device (e.g., using processor 320, memory 330, storage component 340, input component 350, output component 360, and/or the like) may process the data packet based on receiving the data packet, as described above in connection with FIGS. 1A-1O.

As further shown in FIG. 4, process 400 may include transmitting the processed data packet to a second network device on a second wireless channel between the first network device and the second network device, wherein the first network device, the second network device, and the user device are included in a local network, wherein the first network device and the second network device are communicatively connected via a wireless full-duplex link, wherein the wireless full-duplex link includes the second wireless channel and a third wireless channel, and wherein the first wireless channel, the second wireless channel, and the third wireless channel are different wireless channels (block 430). For example, the first network device (e.g., using processor 320, memory 330, storage component 340, output component 360, communication interface 370, and/or the like) may transmit the processed data packet to a second network device on a second wireless channel between the first network device and the second network device, as described above in connection with FIGS. 1A-1O. In some implementations, the first network device, the second network device, and the user device may be included in a local network. In some implementations, the first network device and the second network device may be communicatively connected via a wireless full-duplex link. In some implementations, the wireless full-duplex link may include the second wireless channel and a third wireless channel. In some implementations, the first wireless channel, the second wireless channel, and the third wireless channel may be different wireless channels.

Process 400 may include additional implementations, such as any single implementation or any combination of implementations described below and/or described with regard to any other process described herein.

In some implementations, the first wireless channel may be associated with a first frequency range, the second wireless channel may be associated with a second frequency range, the third wireless channel may be associated with a third frequency range, and the first frequency range, the second frequency range, and the third frequency range may be different frequency ranges. In some implementations, the first wireless channel, the second wireless channel, and the third wireless channel may be non-overlapping wireless channels.

In some implementations, the first wireless channel may be associated with a half-duplex protocol, and the first network device, when processing the data packet, may remove information associated with the half-duplex protocol from a header of the data packet. In some implementations, when transmitting the processed data packet to the second network device on the second wireless channel between the first network device and the second network device, the first network device may transmit the processed data packet to the second network device on the second wireless channel between the first network device and the second network device at a same time as transmitting another data packet to the user device on the first wireless channel between the first network device and the user device.

In some implementations, the first network device may receive, from the second network device, another data packet on the third wireless channel, may process the other data packet based on receiving the other data packet, and may transmit, to the user device, the processed other data packet on the first wireless channel. In some implementations, the wireless full-duplex link may be a first wireless full-duplex link, the first network device and the second network device may be communicatively connected via the first wireless full-duplex link and a second wireless full-duplex link, the second wireless full-duplex link may include a fourth wireless channel and a fifth wireless channel, and the fourth wireless channel and the fifth wireless channel may be different wireless channels.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for wireless backhaul in a local network. In some implementations, one or more process blocks of FIG. 5 may be performed by a first network device (e.g., satellite device 224). In some implementations, one or more process blocks of FIG. 5 may be performed by another device or a group of devices separate from or including the first network device, such as a user device (e.g., user device 222), a second network device (e.g., master device 226) and/or the like.

As shown in FIG. 5, process 500 may include receiving a first data packet on a first wireless channel of a half-duplex link between a user device and the first network device (block 510). For example, the first network device (e.g., using processor 320, memory 330, storage component 340, input component 350, communication interface 370, and/or the like) may receive a first data packet on a first wireless channel of a half-duplex link between a user device and the first network device, as described above in connection with FIGS. 1A-1O.

As further shown in FIG. 5, process 500 may include processing the first data packet based on receiving the first data packet (block 520). For example, the first network device (e.g., using processor 320, memory 330, storage component 340, input component 350, output component 360, and/or the like) may process the first data packet based on receiving the first data packet, as described above in connection with FIGS. 1A-1O.

As further shown in FIG. 5, process 500 may include transmitting the processed first data packet to a second network device on a second wireless channel of a wireless full-duplex link between the first network device and the second network device (block 530). For example, the first network device (e.g., using processor 320, memory 330, storage component 340, output component 360, communication interface 370, and/or the like) may transmit the processed first data packet to a second network device on a second wireless channel of a wireless full-duplex link between the first network device and the second network device, as described above in connection with FIGS. 1A-1O.

As further shown in FIG. 5, process 500 may include receiving a second data packet on a third wireless channel of the wireless full-duplex link between the first network device and the second network device (block 540). For example, the first network device (e.g., using processor 320, memory 330, storage component 340, input component 350, communication interface 370, and/or the like) may receive a second data packet on a third wireless channel of the wireless full-duplex link between the first network device and the second network device, as described above in connection with FIGS. 1A-1O.

As further shown in FIG. 5, process 500 may include transmitting, based on receiving the second data packet, the second data packet to the user device on the first wireless channel of the half-duplex link between the user device and the first network device, wherein the first wireless channel, the second wireless channel, and the third wireless channel are different wireless channels (block 550). For example, the first network device (e.g., using processor 320, memory 330, storage component 340, output component 360, communication interface 370, and/or the like) may transmit, based on receiving the second data packet, the second data packet to the user device on the first wireless channel of the half-duplex link between the user device and the first network device, as described above in connection with FIGS. 1A-1O. In some implementations, the first wireless channel, the second wireless channel, and the third wireless channel may be different wireless channels.

Process 500 may include additional implementations, such as any single implementation or any combination of implementations described below and/or described with regard to any other process described herein.

In some implementations, the first network device may receive a third data packet on the first wireless channel of the half-duplex link between the first network device and the user device, and may transmit, based on receiving the third data packet, the third data packet to the second network device on a fourth wireless channel of another wireless full-duplex link between the first network device and the second network device.

In some implementations, when receiving the second data packet, the first network device may receive the second data packet on the third wireless channel of the wireless full-duplex link between the first network device and the second network device at a same time as transmitting the first data packet to the second network device on the second wireless channel of the wireless full-duplex link between the first network device and the second network device.

In some implementations, when transmitting the first data packet, the first network device may transmit the first data packet to the second network device on the second wireless channel of the wireless full-duplex link between the first network device and the second network device at a same time as transmitting a third data packet to the second network device on a fourth wireless channel of another wireless full-duplex link between the first network device and the second network device.

In some implementations, the first wireless channel may be associated with a half-duplex protocol, and processing the first data packet may include removing information associated with the half-duplex protocol from a header of the first data packet. In some implementations, the user device, the first network device, and the second network device may be included in a local network.

In some implementations, the first network device may determine whether bandwidth usage on the wireless full-duplex link satisfies a bandwidth usage threshold, and may activate another wireless full-duplex link between the first network device and the second network device based on determining that the bandwidth usage on the wireless full-duplex link satisfies the bandwidth usage threshold. In some implementations, the other wireless full-duplex link may include a fourth wireless channel and a fifth wireless channel, and the fourth wireless channel and the fifth wireless channel may be different wireless channels.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for wireless backhaul in a local network. In some implementations, one or more process blocks of FIG. 6 may be performed by a first network device (e.g., satellite device 224). In some implementations, one or more process blocks of FIG. 6 may be performed by another device or a group of devices separate from or including the first network device, such as a user device (e.g., user device 222), a second network device (e.g., master device 226) and/or the like.

As shown in FIG. 6, process 600 may include receiving a first data packet on a first wireless channel between a user device and the first network device (block 610). For example, the first network device (e.g., using processor 320, memory 330, storage component 340, input component 350, communication interface 370, and/or the like) may receive a first data packet on a first wireless channel between a user device and the first network device, as described above in connection with FIGS. 1A-1O.

As shown in FIG. 6, process 600 may include processing the first data packet based on receiving the first data packet (block 620). For example, the first network device (e.g., using processor 320, memory 330, storage component 340, input component 350, output component 360, and/or the like) may process the first data packet based on receiving the first data packet, as described above in connection with FIGS. 1A-1O.

As shown in FIG. 6, process 600 may include transmitting the processed first data packet to a second network device on a second wireless channel of a wireless full-duplex link between the first network device and the second network device (block 630). For example, the first network device (e.g., using processor 320, memory 330, storage component 340, output component 360, communication interface 370, and/or the like) may transmit the processed first data packet to a second network device on a second wireless channel of a wireless full-duplex link between the first network device and the second network device, as described above in connection with FIGS. 1A-1O.

As shown in FIG. 6, process 600 may include receiving a second data packet on a third wireless channel of the wireless full-duplex link between the first network device and the second network device (block 640). For example, the first network device (e.g., using processor 320, memory 330, storage component 340, input component 350, communication interface 370, and/or the like) may receive a second data packet on a third wireless channel of the wireless full-duplex link between the first network device and the second network device, as described above in connection with FIGS. 1A-1O.

As shown in FIG. 6, process 600 may include processing the second data packet based on receiving the second data packet (block 650). For example, the first network device (e.g., using processor 320, memory 330, storage component 340, and/or the like) may process the second data packet based on receiving the second data packet, as described above in connection with FIGS. 1A-1O.

As shown in FIG. 6, process 600 may include transmitting the processed second data packet to the user device on the first wireless channel between the user device and the first network device, wherein the first wireless channel, the second wireless channel, and the third wireless channel are different wireless channels (block 660). For example, the first network device (e.g., using processor 320, memory 330, storage component 340, output component 360, communication interface 370, and/or the like) may transmit the processed second data packet to the user device on the first wireless channel between the user device and the first network device, as described above in connection with FIGS. 1A-1O. In some implementations, the first wireless channel, the second wireless channel, and the third wireless channel may be different wireless channels.

Process 600 may include additional implementations, such as any single implementation or any combination of implementations described below and/or described with regard to any other process described herein.

In some implementations, the first wireless channel between the user device and the first network device may be associated with a half-duplex link between the user device and the first network device, and the first network device may, when processing the first data packet, remove half-duplex protocol information, associated with the half-duplex link, from a header of the first data packet. In some implementations, the half-duplex protocol information may include a power management field, a quality of service (QoS) control field, a frame control field, and/or a sequence control field.

In some implementations, the first wireless channel between the user device and the first network device may be associated with a half-duplex link between the user device and the first network device. In some implementations, the first network device, when processing the second data packet, may add half-duplex protocol information, associated with the half-duplex link, to a header of the second data packet.

In some implementations, when transmitting the first data packet to the second network device and receiving the second data packet on the third wireless channel, the network device may transmit the first data packet on the second wireless channel and receive the second data packet on the third wireless channel. In some implementations, the network device may determine whether bandwidth usage on the wireless full-duplex link satisfies a bandwidth usage threshold, and may activate a fourth wireless channel associated with another wireless full-duplex link based on determining that the bandwidth usage on the wireless full-duplex link satisfies the bandwidth usage threshold.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, communications between a user device (e.g., user device 222) and a network device (e.g., satellite device 224), and communications between the network device and another network device (e.g., master device 226), do not compete for airtime on the same wireless channel, which increases throughput in a local network (e.g., local network 220), decreases latency in the local network, and increases scalability of the local network as more devices are added to the local network. Moreover, since the link between the network device and the other network device is a full-duplex link, processing and memory resources on the network device and the other network devices that would otherwise be used to perform half-duplex scheduling are conserved.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

As used herein, the term packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first network device, comprising:
one or more memories; and
one or more processors, communicatively coupled to the one or more memories, to:
receive, from a user device, a data packet on a first wireless channel between the user device and the first network device,
wherein the first wireless channel is associated with a half-duplex protocol;
process the data packet based on receiving the data packet,
wherein the one or more processors, when processing the data packet, are to:
remove information associated with the half-duplex protocol from a header of the data packet; and transmit the processed data packet to a second network device on a second wireless channel between the first network device and the second network device,
  wherein the first network device, the second network device, and the user device are included in a local network,
  wherein the first network device and the second network device are communicatively connected via a wireless full-duplex link,
  wherein the wireless full-duplex link includes the second wireless channel and a third wireless channel, and
  wherein the first wireless channel, the second wireless channel, and the third wireless channel are different wireless channels.

2. The first network device of claim 1, wherein the first wireless channel is associated with a first frequency range,
  wherein the second wireless channel is associated with a second frequency range,
  wherein the third wireless channel is associated with a third frequency range, and
  wherein the first frequency range, the second frequency range, and the third frequency range are different frequency ranges.

3. The first network device of claim 1, wherein the first wireless channel, the second wireless channel, and the third wireless channel are non-overlapping wireless channels.

4. The first network device of claim 1, wherein the one or more processors, when transmitting the processed data packet to the second network device on the second wireless channel between the first network device and the second network device, are to:
  transmit the processed data packet to the second network device on the second wireless channel between the first network device and the second network device at a same time as transmitting another data packet to the user device on the first wireless channel between the first network device and the user device.

5. The first network device of claim 1, wherein the one or more processors are further to:
  receive, from the second network device, another data packet on the third wireless channel;
  process the other data packet based on receiving the other data packet; and
  transmit, to the user device, the processed other data packet on the first wireless channel.

6. The first network device of claim 1, wherein the wireless full-duplex link is a first wireless full-duplex link,
  wherein the first network device and the second network device are communicatively connected via the first wireless full-duplex link and a second wireless full-duplex link,
  wherein the second wireless full-duplex link includes a fourth wireless channel and a fifth wireless channel, and
  wherein the fourth wireless channel and the fifth wireless channel are different wireless channels.

7. A method, comprising:
  receiving, at a first network device, a first data packet on a first wireless channel of a half-duplex link between a user device and the first network device;
  processing, by the first network device, the first data packet based on receiving the first data packet,
  wherein processing the first data packet comprises:
    removing information associated with a half-duplex protocol from a header of the first data packet;
  transmitting, by the first network device, the processed first data packet to a second network device on a second wireless channel of a wireless full-duplex link between the first network device and the second network device;
  receiving, at the first network device, a second data packet on a third wireless channel of the wireless full-duplex link between the first network device and the second network device; and
  transmitting, by the first network device and based on receiving the second data packet, the second data packet to the user device on the first wireless channel of the half-duplex link between the user device and the first network device,
  wherein the first wireless channel, the second wireless channel, and the third wireless channel are different wireless channels.

8. The method of claim 7, further comprising:
  receiving, at the first network device, a third data packet on the first wireless channel of the half-duplex link between the first network device and the user device; and
  transmitting, based on receiving the third data packet, the third data packet to the second network device on a fourth wireless channel of another wireless full-duplex link between the first network device and the second network device.

9. The method of claim 7, wherein receiving the second data packet comprises:
  receiving the second data packet on the third wireless channel of the wireless full-duplex link between the first network device and the second network device at a same time as transmitting the first data packet to the second network device on the second wireless channel of the wireless full-duplex link between the first network device and the second network device.

10. The method of claim 7, wherein transmitting the first data packet comprises:
  transmitting the first data packet to the second network device on the second wireless channel of the wireless full-duplex link between the first network device and the second network device at a same time as transmitting a third data packet to the second network device on a fourth wireless channel of another wireless full-duplex link between the first network device and the second network device.

11. The method of claim 7, wherein the user device, the first network device, and the second network device are included in a local network.

12. The method of claim 7, further comprising:
  determining whether bandwidth usage on the wireless full-duplex link satisfies a bandwidth usage threshold; and
  activating another wireless full-duplex link between the first network device and the second network device based on determining that the bandwidth usage on the wireless full-duplex link satisfies the bandwidth usage threshold,
  wherein the other wireless full-duplex link includes a fourth wireless channel and a fifth wireless channel, and
  wherein the fourth wireless channel and the fifth wireless channel are different wireless channels.

13. A non-transitory computer-readable medium storing instructions, the instructions comprising:
  one or more instructions that, when executed by one or more processors of a first network device, cause the one or more processors to:

receive a first data packet on a first wireless channel between a user device and the first network device,
    wherein the first wireless channel is associated with a half-duplex protocol;
process the first data packet based on receiving the first data packet,
    wherein the one or more instructions, that cause the one or more processors to process the first data packet, cause the one or more processors to:
        remove information associated with the half-duplex protocol from a header of the first data packet;
transmit the processed first data packet to a second network device on a second wireless channel of a wireless full-duplex link between the first network device and the second network device;
receive a second data packet on a third wireless channel of the wireless full-duplex link between the first network device and the second network device;
process the second data packet based on receiving the second data packet; and
transmit the processed second data packet to the user device on the first wireless channel between the user device and the first network device,
    wherein the first wireless channel, the second wireless channel, and the third wireless channel are different wireless channels.

14. The non-transitory computer-readable medium of claim 13, wherein the information associated with the half-duplex protocol includes at least one of:
    a power management field,
    a quality of service (QoS) control field,
    a frame control field, or
    a sequence control field.

15. The non-transitory computer-readable medium of claim 13,
    wherein the one or more instructions, that cause the one or more processors to process the second data packet, cause the one or more processors to:
    add half-duplex protocol information, associated with the half-duplex protocol, to a second header of the second data packet.

16. The non-transitory computer-readable medium of claim 13, wherein the one or more instructions, that cause the one or more processors to transmit the first data packet to the second network device and receive the second data packet on the third wireless channel, cause the one or more processors to:
    transmit the first data packet on the second wireless channel and receive the second data packet on the third wireless channel.

17. The non-transitory computer-readable medium of claim 13, wherein the one or more instructions further cause the one or more processors to:
    determine whether bandwidth usage on the wireless full-duplex link satisfies a bandwidth usage threshold; and
    activate a fourth wireless channel associated with another wireless full-duplex link based on determining that the bandwidth usage on the wireless full-duplex link satisfies the bandwidth usage threshold.

18. The non-transitory computer-readable medium of claim 13, wherein the first wireless channel is associated with a first frequency range,
    wherein the second wireless channel is associated with a second frequency range,
    wherein the third wireless channel is associated with a third frequency range, and
    wherein the first frequency range, the second frequency range, and the third frequency range are different frequency ranges.

19. The first network device of claim 1, wherein the one or more processors are further to:
    determine whether bandwidth usage on the wireless full-duplex link satisfies a bandwidth usage threshold; and
    activate a second wireless full-duplex link between the first network device and the second network device based on determining that the bandwidth usage on the first wireless full-duplex link satisfies the bandwidth usage threshold.

20. The method of claim 7, wherein the first wireless channel is associated with a first frequency range,
    wherein the second wireless channel is associated with a second frequency range,
    wherein the third wireless channel is associated with a third frequency range, and
    wherein the first frequency range, the second frequency range, and the third frequency range are different frequency ranges.

* * * * *